US007108190B2

(12) United States Patent
Burgan et al.

(10) Patent No.: US 7,108,190 B2
(45) Date of Patent: Sep. 19, 2006

(54) TOKEN ARRAY AND METHOD EMPLOYING AUTHENTICATION TOKENS BEARING SCENT FORMULATION INFORMATION

(75) Inventors: Raymond John Burgan, Appleton, WI (US); Ted Ernest Goodwin, Appleton, WI (US); Steven Lawrence Vervacke, Appleton, WI (US)

(73) Assignee: Appleton Papers Inc., Aplleton, WI (US)

( * ) Notice: Subject to any disclaimer, the term of this patent is extended or adjusted under 35 U.S.C. 154(b) by 0 days.

(21) Appl. No.: 10/377,534

(22) Filed: Feb. 28, 2003

(65) Prior Publication Data

US 2004/0169071 A1  Sep. 2, 2004

(51) Int. Cl.
 *G06K 19/00* (2006.01)
(52) U.S. Cl. ........................... 235/487; 235/494
(58) Field of Classification Search ............... 235/487, 235/494, 380, 382, 382.5, 375
 See application file for complete search history.

(56) References Cited

U.S. PATENT DOCUMENTS

| RE23,024 E | 8/1948 | Adams |
|---|---|---|
| RE23,027 E | 8/1948 | Fitch et al. |
| 2,730,456 A | 1/1956 | Green et al. |
| 2,800,457 A | 7/1957 | Green et al. |
| 2,800,458 A | 7/1957 | Green |
| 3,041,289 A | 6/1962 | Katchen et al. |
| 3,244,550 A | 4/1966 | Farnham et al. |
| 3,421,223 A | 1/1969 | Stark |
| 3,455,721 A | 7/1969 | Phillips, Jr. et al. |
| 3,491,111 A | 1/1970 | Lin |
| 3,491,112 A | 1/1970 | Lin |
| 3,491,116 A | 1/1970 | Lin |
| 3,509,174 A | 4/1970 | Lin |
| 3,516,941 A | 6/1970 | Matson |
| 3,539,375 A | 11/1970 | Baum |
| 3,565,666 A | 2/1971 | Phillips, Jr. |
| 3,622,364 A | 11/1971 | Sugahara et al. |
| 3,624,107 A | 11/1971 | Lin |
| 3,627,787 A | 12/1971 | Lin |
| 3,641,011 A | 2/1972 | Lin et al. |
| 3,642,828 A | 2/1972 | Farber et al. |
| 3,672,935 A | 6/1972 | Miller et al. |
| 3,674,535 A | 7/1972 | Blose et al. |
| 3,681,390 A | 8/1972 | Lin |
| 3,732,120 A | 5/1973 | Brockett et al. |
| 3,737,410 A | 6/1973 | Mueller |
| 3,746,675 A | 7/1973 | Blose et al. |
| 3,753,761 A | 8/1973 | Sugahara et al. |
| 3,775,424 A | 11/1973 | Farber |
| 3,806,463 A | 4/1974 | Konishi et al. |
| 3,853,869 A | 12/1974 | Farber |
| 3,883,392 A | 5/1975 | Burylo et al. |

(Continued)

FOREIGN PATENT DOCUMENTS

DE  19654607  6/1998

(Continued)

OTHER PUBLICATIONS

Tim Brice, The Electronic Nose, May 1, 1997, published at http://mishkin.jpl.nasa.gov/enose.html, 3 pages.

*Primary Examiner*—Karl D. Frech
(74) *Attorney, Agent, or Firm*—Banner & Witcoff, Ltd.

(57) ABSTRACT

Scent formulation information is imparted onto an authentication token. The scent formulation information may be used in numerous authentication applications, such as security badges, airline tickets, and so forth. Various methods and systems involving such tokens are disclosed.

39 Claims, 26 Drawing Sheets

U.S. PATENT DOCUMENTS

| | | |
|---|---|---|
| 3,920,510 A | 11/1975 | Hatano et al. |
| 3,955,026 A | 5/1976 | Matsukawa et al. |
| 3,959,571 A | 5/1976 | Yahagi et al. |
| 3,959,881 A | 6/1976 | Kokal, Jr. |
| 3,971,808 A | 7/1976 | Baumann et al. |
| 3,996,405 A | 12/1976 | Porter, Jr. |
| 4,001,140 A | 1/1977 | Foris et al. |
| 4,022,936 A | 5/1977 | Miller et al. |
| 4,027,065 A | 5/1977 | Brockett et al. |
| 4,081,376 A | 3/1978 | Strub |
| 4,087,376 A | 5/1978 | Foris et al. |
| 4,089,802 A | 5/1978 | Foris et al. |
| 4,100,103 A | 7/1978 | Foris et al. |
| 4,105,823 A | 8/1978 | Hasler et al. |
| 4,130,299 A | 12/1978 | Wygant |
| 4,151,748 A | 5/1979 | Baum |
| 4,165,102 A | 8/1979 | Bodmer |
| 4,165,103 A | 8/1979 | Bodmer |
| 4,166,644 A | 9/1979 | Kay et al. |
| 4,181,771 A | 1/1980 | Hanson et al. |
| 4,188,456 A | 2/1980 | Patel |
| 4,221,710 A | 9/1980 | Hoshi et al. |
| 4,246,318 A | 1/1981 | Baum |
| 4,251,386 A | 2/1981 | Saeki et al. |
| 4,287,074 A | 9/1981 | Earhart et al. |
| 4,356,109 A | 10/1982 | Saeki et al. |
| 4,429,001 A | 1/1984 | Kolpin et al. |
| 4,444,699 A | 4/1984 | Hayford |
| 4,470,057 A | 9/1984 | Glanz |
| 4,510,513 A | 4/1985 | Yamaguchi et al. |
| 4,522,811 A | 6/1985 | Eppstein et al. |
| 4,547,429 A | 10/1985 | Greiner et al. |
| 4,552,811 A | 11/1985 | Brown et al. |
| 4,596,996 A | 6/1986 | Sandberg et al. |
| 4,622,267 A | 11/1986 | Riecke |
| 5,409,839 A | 4/1995 | Balestrieri et al. |
| 5,458,487 A | 10/1995 | Komatsu et al. |
| 5,464,803 A | 11/1995 | McGuinness et al. |
| 5,472,489 A | 12/1995 | Sheiham et al. |
| 5,474,967 A | 12/1995 | Komatsu et al. |
| 5,476,829 A | 12/1995 | Taylor et al. |
| 5,605,874 A | 2/1997 | Taylor et al. |
| 5,674,339 A | 10/1997 | Groeger et al. |
| 5,675,070 A | 10/1997 | Gelperin |
| 5,873,604 A | 2/1999 | Phillips |
| 5,918,257 A | 6/1999 | Mifsud et al. |
| 6,004,666 A | 12/1999 | Hörnig et al. |
| 6,085,576 A | 7/2000 | Sunshine et al. |
| 6,152,731 A | 11/2000 | Jordan et al. |
| 6,219,993 B1 | 4/2001 | Linkiewicz |
| 6,310,002 B1 | 10/2001 | Krzoska et al. |
| 6,322,359 B1 | 11/2001 | Jordan et al. |
| 6,334,853 B1 | 1/2002 | Kopelman et al. |
| 6,517,648 B1 | 2/2003 | Bouchette et al. |
| 6,655,686 B1 * | 12/2003 | Morgan ............... 273/248 |

FOREIGN PATENT DOCUMENTS

| | | |
|---|---|---|
| EP | 0762342 | 3/1997 |
| FR | 2800896 | 5/2001 |

* cited by examiner

| S1 VALUE | S2 VALUE | S3 VALUE | ADDITIONAL INFORMATION VALUE |
|----------|----------|----------|------------------------------|

FIG. 14

| CHECK VALUE | ADDITIONAL INFORMATION VALUE |
|---|---|

FIG. 16A

| S1 VALUE | S2 VALUE | S3 VALUE | IDENTIFICATION INFORMATION |
|---|---|---|---|

TOKEN ARRAY AND METHOD EMPLOYING AUTHENTICATION TOKENS BEARING SCENT FORMULATION INFORMATION

TECHNICAL FIELD OF THE INVENTION

The invention is in the field of authentication tokens, including such tokens as security documents, badges, and the like. The invention is also in the field of security methods.

BACKGROUND OF THE INVENTION

Security tokens have long been in use. The function of a security token is to authenticate either the token itself or the individual or other entity associated with the token. For instance, the token may take the form of a check or other negotiable document. Numerous security planchettes, such as holograms, watermarks, and the like have been applied to such documents to make forgery and duplication of such tokens difficult. The prior art has also taught to provide encapsulated fragrances as a form of security planchette, whereby the authenticity of a document or other token may be verified by determining whether the token emits a scent when an attempt is made to rupture the microcapsules.

Authentication tokens also may be used to identify the entity associated with the token, such as to provide identification information on a security badge or to identify the contents or destination of a box that bears a shipping tag. Often, an authentication token will contain numerous authenticating indicia, some of which are used to authenticate the token and some of which are used for other authentication purposes. For instance, credit cards and other financial transaction cards prepared in accordance with standards such as ISO 7810:1995, 7811-1, 7811-2, 7811-3, 7811-4, 7811-5, 7811-6, 7813 and related standards often containing one or more planchettes, such as a hologram, in addition to magnetically encoded information. The magnetically encoded information identifies the account number of the cardholder and can be used to process transactions, such as purchases and debit withdrawals. The hologram is difficult to forge and the presence of the hologram is intended to provide assurance to the recipient of the card that the card is genuine.

Sophisticated forging techniques have been devised and continue to evolve, and there is a continuing need for new fonns of authentication tokens. Ideally, an authentication token should be difficult to forge or duplicate, and should be amenable to numerous uses, from non-security applications such as warehouse tags, to low security applications such as library cards and "frequent guest" or "frequent diner" cards issued by restaurants and other businesses, to high security applications such as access badges and secure documents. The invention seeks to provide such an authentication token, and also to provide methods and systems involving the same.

THE INVENTION

It has now been discovered that a token can be imparted with scent formulation information, by which is contemplated information beyond the mere presence or absence of a scent or combination of scents but rather information sufficient to distinguish otherwise identical or similar tokens from one another. In theory, it is conceivable that the scent formulation information may be nasally detectable by humans or animals, but in preferred embodiments it is contemplated that the scent formulation information will be detectable via a so-called "artificial nose" or other electronic vapor sensor. In highly preferred embodiments of the invention, encoded information can be provided on the token in much the same way as is presently accomplished via magnetic encoding techniques. The authentication token thus lends itself to numerous authentication uses.

The invention contemplates a token array that comprises plural fractions of dissimilar tokens. The invention also contemplates numerous methods and systems involving such tokens, as set forth hereinbelow.

Features of the preferred embodiments of the invention will be discussed hereinbelow with reference to the accompanying Figures, in which:

SUMMARY OF THE FIGURES

FIG. 11 is a representation of database record useful in conjunction with the method of FIG. 10.

FIG. 14 is representation of a database record useful in conjunction with the method of FIG. 13.

FIG. 16A is a database record useful in conjunction with the method of FIG. 16.

DESCRIPTION OF THE PREFERRED EMBODIMENTS

Figure 1:
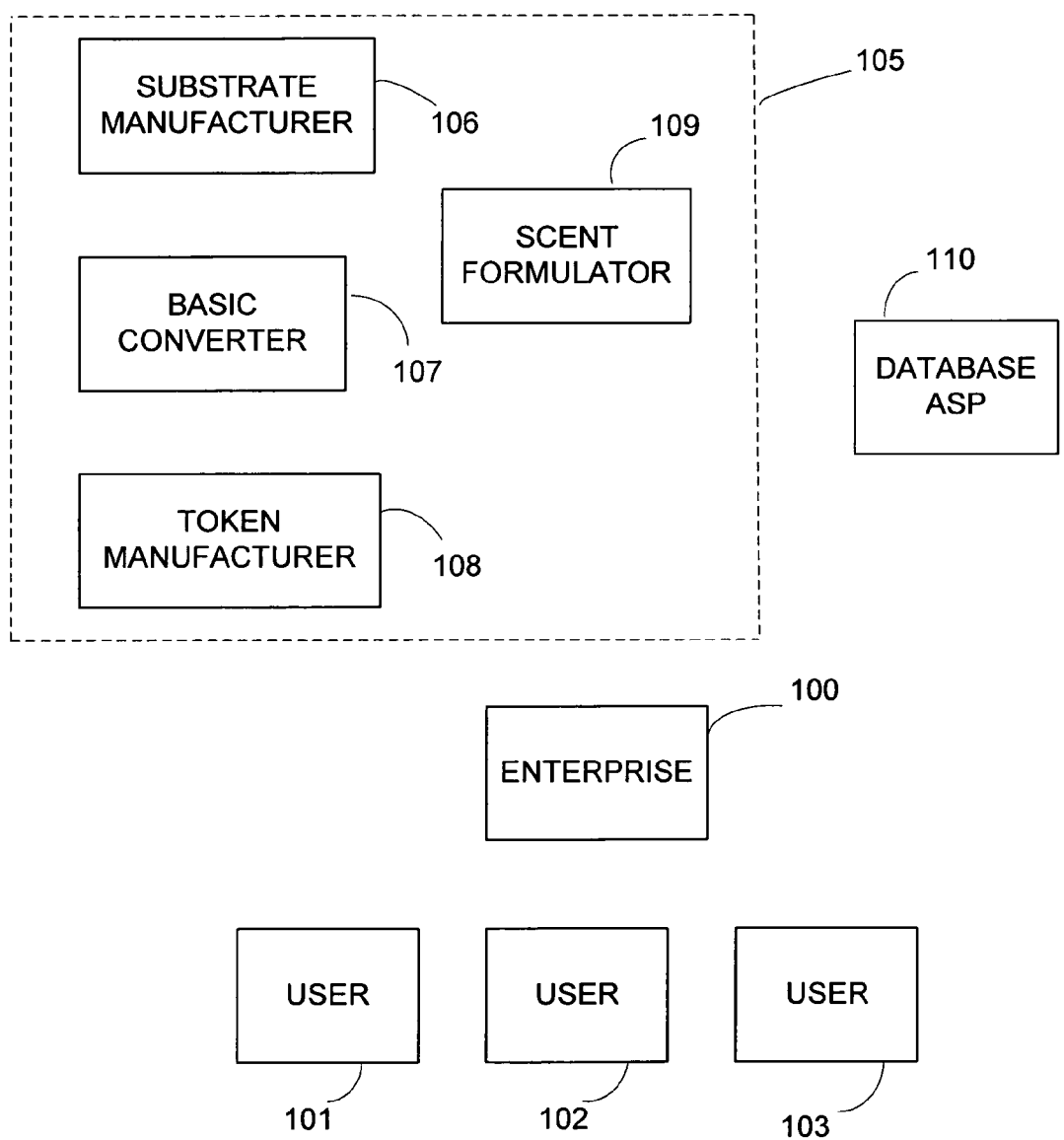
FIG. 1 is a representation of authentication environment that includes plural tokens each bearing scent formulation information.

The invention is contemplated to be applicable for authentication tokens which bear an indicia intended to authenticate the token itself as well as indicia for providing identification information, by which is contemplated information beyond that used to authenticate the token itself used in an authentication environment. The identification information, for instance, may be information sufficient to identify a person, a company, a room number, a billing code, a tracking unit, an account number, or, more generally, any other entity or information. The token itself may be any physical object used in an authentication environment. Non-limiting examples of authentication tokens include checks, money orders, currency, chits, tracking labels, warehousing tracking cards, tickets (e.g. transportation tickets, such as airline tickets, or event tickets, such as theater and sporting event tickets), merchandise tags, luggage tags, personnel badges (such as laboratory badges), security badges, "smart" cards, accesses cards, debit or credit cards, library cards, "frequent guest" or "frequent diner" cards, passports, visas, titles, licenses, registrations, deeds, other legal documents, negotiable documents, fobs, cards, keys, certificate of authenticity or authority, stock certificates, bonds, purchase order forms (such as business, governmental, or medicinal forms), shipping labels, postage tags or stamps, customs forms, labels, coupons, lottery tickets, casino chips, controlled documents, military and security tokens, bottle labels, prescription pads, transcripts, part authentication tags (e.g., for airline or automobile parts) and so forth. Generally, the invention is contemplated to be applicable in any environment wherein it is desired to confirm the authenticity of a token and/or to retrieve identification information from a token.

Physically, the token comprises a substrate on or in which scent formulation information is included. The substrate can be paper, polymeric film, cardboard, plastic, or, more generally, any suitable substrate. Paper will often be the preferred substrate, particularly when the authentication token has a one-time or limited-time use (e.g., a ticket). The token includes scent formulation information, by which is contemplated at least one and preferably two or more scent components borne by the token in a manner such that the scent components are not released (or are released only very slowly, such that the token is stable for a period consistent with its intended life span) until such time as it is desired to retrieve authentication information from the token. At this time, the scent formulation information should be readily obtainable from the token.

The scent components may be any material that is volatile at the intended temperature of use of the token (typically, at room temperature or optionally at a higher temperature if the substrate is to be heated prior to scanning) and that may be detected in accordance with the purposes of the token. There are millions of compounds that may be used as scent components in accordance with the invention; specific examples include perfumes, scents, flavorants, flavonoids, fragrances, and the like. A scent component can also include nonfragrant volatile liquids or ordinary organic or inorganic solvents, particularly when such liquids have a vapor pressure at ambient temperature. Solvents, although commonly thought of as nonfragrant, may nonetheless serve as scent components for purposes of the invention. Such solvents typically have a characteristic odor or sufficient vapor pressure to be detectable by electronic instrument means. For some applications, a heating step may be used to volatilize the encapsulated component when the capsules are fractured. Suitable volatile liquids and solvents include alcohols such as ethanol, benzyl alcohol, ketones such as methyl ethyl ketone, carboxylic acids such as acetic acid, polyhydric compounds such as ethylene glycol without limitation. The liquid is preferably present in sufficient quantity to exhibit sufficient vapor pressure to be detectable by the electronic reader. The encapsulated liquid ideally is selected to have little to no toxicity, a pleasing fragrance or a minimum of fragrance, and a distinct electronic fingerprint detectable with the reader. If a solvent is employed in addition to the scent component, it should be selected so as to not unduly interfere with the detection of the primary scent component. The scent components preferably are microencapsulated neat but instead may be solubilized in a volatile carrier, such as a lower order alcohol. Other suitable solvents (which in some embodiments may themselves be scent components) include ethyldiphenylmethane, benzyxylenes, alkyl biphenyls such as propylbiphenyl, and butylbiphenyl, dialkyl phthalates in which the alkyl groups thereof have from 4 to 13 carbon atoms, e.g. dibutyl phthalate, dioctylphthalate, dinonyl phthalate and ditridecylphthalate; 2,2,4-trimethyl-1,3-pentanediol diisobutyrate; C10–C14 alkyl benzenes such as dodecyl benzene; alkyl or aralkyl benzoates such as benzyl benzoate; alkylated naphthalenes such as dipropylnaphthalene; partially hydrogenated terphenyls; high-boiling straight or branched chain hydrocarbons; and mixtures of the above.

The scent components may be borne by the token in any suitable matter. In preferred embodiments, the scent components are microencapsulated, and the microencapsulated components are applied in a strip on the surface of the token. Microencapsulation techniques are well known in the art; exemplary disclosure is found in U.S. Pat. Nos. 4,001,140; 4,081,376; 4,089,802; 4,100,103; 4,105,823; 4,444,699; and 4,552,811. These references pertain to preparation of microcapsules from a urea-formaldehyde resin and/or a melamine-formaldehyde resin. Other disclosure pertaining to microcapsules can be found in U.S. Pat. Nos. 2,800,457 and 3,041,289. It is contemplated that other forms of encapsulation (such as mechanical capsules) may be employed in alterative embodiments. Alternatively, the scent components, whether neat or solublized, may be captured in a relatively non-volatile matrix, such as gelatin. In either such embodiment, the scent components will remain stable for an extended period of time, often several years, yet readily may be released from the token merely by physically disrupting the scent strip. Generally, if a melamine-formaldehyde or urea-formaldehyde microencapsulation system is employed, the scent components and any solvents should be compatible with such microcapsules.

Each token preferably is provided as a part of a token array, the array including a plurality of authentication tokens. Each of the tokens in the array bears is at least one scent component, and preferably at least two scent components. The array is divided into at least two fractions, preferably at least four fractions, and more preferably at least five fractions. Each of the fractions comprises at least one token that includes scent formulation information, wherein the tokens in each of the fractions have similar scent formulation and the token in the other fractions have dissimilar scent formulation information from tokens in other fractions. For instance, the fractions may represent various groups of airline tickets, whereby the scent formulation information in one fraction is identical for each ticket used by a given airline but is different from that used by other airlines. The scent formulation information preferably comprises at least two scent components, more preferably at least four scent components, and even more preferably at least five scent components.

Figure 3:
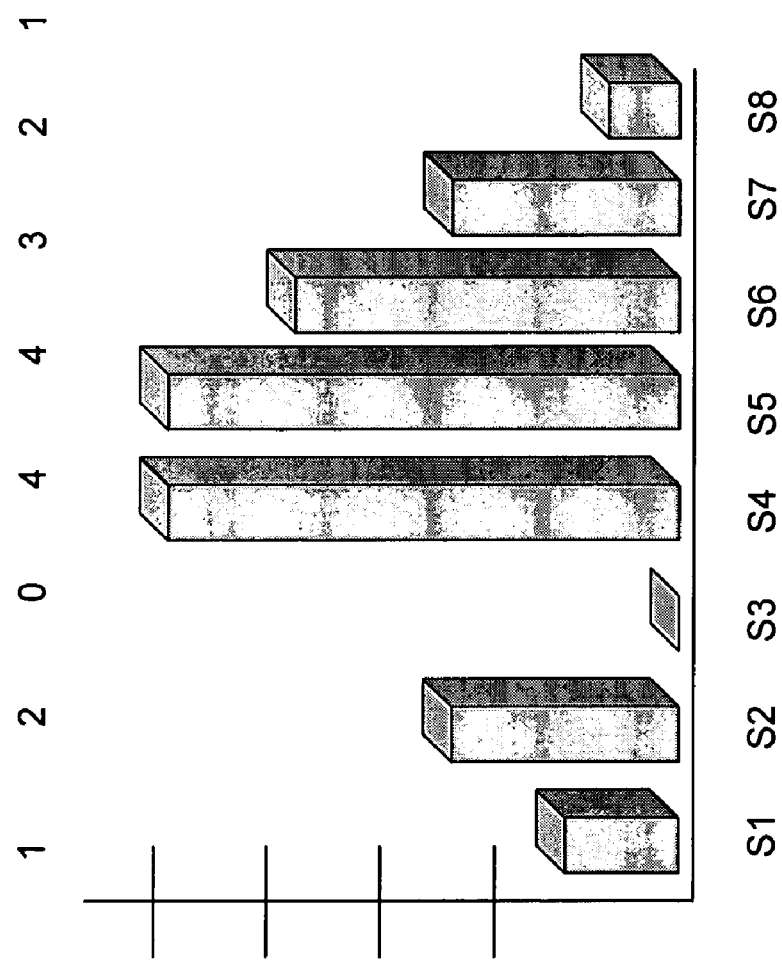
FIG. 3 is a representation in chart form of encoded scent formulation information.

The scent formulation information may comprise information as to various combinations of the two or more scent components, and/or information as to the quantity of one or more of the scent components, the quantity being represented, for instance, by the percent fraction of the scent component in a volatile solvent. With reference to FIG. 3, for instance, the ordinate of the chart represents various scent components (S1–S8), on a token and the abscissa of the chart represents various levels of each of the scent components in a solution. In this token, it is contemplated that each of the scent components may be present in an minimal amount of zero and in incremental amounts ranging from "1" to "4," the values "1" through "4" signifying, for instance, various percentages of the scent formulation information components in a solution. It is thus seen that in the various scent components may together form a code or "word." In FIG. 3, the code represented by the various scent components (S1–S8) is 1-2-0-4-4-3-2-1. It is likewise seen that different codes may be formulated by varying the amounts of scent formulation components to S1–S8. In this example, there are five possible "levels" for each of the eight scent components, and there are thus 390,625 codes expressible as scent formulation information. A greater or smaller number of codes may be provided by increasing or decreasing the number of scent components or by increasing or deceasing the number of permissible "levels" of each scent component in solution. Physically, it is contemplated that the scent components may be combined into a single solution and provided in microencapsulated or other form onto a substrate. It is further contemplated that the scent components may be provided separately in one or more fractions of microcapsules, wherein plural types of microcapsules may be applied to the substrate.

It is contemplated that one or more readers may be provided in connection with the present invention. The reader should include a mechanism for releasing scent from the token, for instance, a mechanical device to rupture the microcapsules present on the token substrate, and further including a scent component detector to detect the various scent components present on the substrate. In some embodiments, the operator may be required to rupture the microcapsules manually. In practice, the reader preferably will comprise an analog detector and an analog to digital converter for converting the analog information as to the presence and/or quantity of the scent component into a digital signal. The digital signal will be conveyed to a controller, which may be integrated into the reader or which may be remote (the digital signal being conveyed over a computer network). The reader can consist of an array thin film sensors that respond to the vapor pressure of the scent component in the ppm (parts per million) range or lower depending on the detection limit of the particular sensor or reader. The reader can use a single array or, more preferably, a multisensing array. The distributed response of an array for example can be used to detect a gas, namely the molecules escaping the liquid of the scent component due to the positive vapor pressure. Individual sensors in the reader may or may not be specific to any one gas. By using an array of different sensors, gas mixtures can be uniquely detected by a pattern of measured electrical response. Electronic sensors of materials capable of detecting materials having a positive vapor pressure are known. Sophisticated readers would take the form of electronic noses, producing a measured electrical response to a wide variety of materials and are preferred herein. Other readers can be based on infrared sensors, or GC-mass spectrometer sensors and detectors. There are several laboratory-based instruments, some that employing an array of metal oxide sensors, and others employing an array of conducting polymer sensors. Desk-top sized electronic nose instruments are available commercially. Several portable instruments are known.

An electronic nose is an instrument used to detect vapors or chemical analytes in gases, or emanating from liquids or solids. The electronic nose mimics a mammalian olfactory system. An electronic nose is a system having an array of sensors that are used in conjunction with pattern recognition algorithms. Using a combination of chemical sensors, a fingerprint of the vapor or gas is produced as an electronic signal. Cyrano Sciences Inc. of Pasadena Calif. markets a hand held electronic nose under the brand Cyranose™320. This is a hand held chemical detector for detecting and identifying vapors. It is marketed as a machine that digitizes smell. It can readily detect simple alcohols such as isopropyl alcohol and others. The Cyranose™320 can be programmed with the scent formulation information of a target material to aid in detection. The Cyranose™320 electronic nose is more fully described in U.S. Pat. No. 6,085,576 assigned to Cyrano Sciences and incorporated herein by reference. Other commercial suppliers of portable chemical detectors, olfactory readers or electronic noses include Neotronics of Hertfordshire, UK; Alpha MOS, a French company with offices in DeMotte, Ind.; Aromascan Inc of Hollis, N.H. and others. Additional electronic sensors are also described in U.S. Pat. No. 5,675,070 (NCR Corp., Dayton Ohio); and U.S. Pat. No. 5,918,257 (Alpha MOS) also incorporated herein by reference.

The invention further contemplates a writer that is used to impart scent formulation information onto a substrate. The writer may be any device now known or hereinafter discovered as may be suitable for use in conjunction with the introduction of stabilized scent components onto or into a substrate. Such devices are well known in art, particularly in connection with the carbonless paper industries. The writer may be, for instance, a paper coating machine which applies a coating to paper in roll form, or may be a spot printer which applies microencapsulated scent formulation to a portion of a substrate.

With reference to FIG. 1, an environment in which the invention is operable includes an enterprise 100, which ordinarily is the entity which distributes tokens to a plurality of users 101–103. The enterprise may be, for instance, an airline, and the users may be passengers each receiving a ticket or boarding pass from the airline directly or indirectly through an authorized distributor. The enterprise receives tokens from a vendor 105. It is contemplated that numerous entities may be involved in the preparation and vending of the tokens to the enterprise. For instance, a substrate manufacturer 106 (such as a paper company) may provide paper in roll form to a basic converter 107, which is an entity such as a sheeter, who cuts the paper into ticket form. The token manufacturer 108 may be a separate entity that purchases ticket blanks from the converter and generates tickets for the enterprise. The scent formulator 109 may be yet a different entity. It is contemplated in this embodiment that the scent formulator prepares microcapsules or other stabilized form of scent formulation information and supplies same to the token manufacturer for use in manufacture of the tokens. It is contemplated that in actual practice one or more entities may be combined or redistributed or may operate otherwise than as depicted. For instance, the basic converter, token manufacturer, and scent formulator may be one entity. Conversely, the enterprise itself may be the one to apply scent formulation information to the tokens after receipt of the tokens from the token manufacture.

Optionally, the environment contemplates a database application service provider 110, which is an entity that maintains scent formulation information and optionally other information useful in conjunction with the activities of the enterprise. The database application service provider may be remote from other entities, and other entries may override with the database application service provide via a network (such as a TCP/IP network, including for instance the Internet). Exemplary disclosure concerning the role of a database application service provider may be found in copending application Ser. No. 10/377,534 entitled "System and Method of for Tracking and Authenticating Items Through an Internet Web Site, Filed on the same day as the present application in the name of inventors George Harold Baus, Peter Ralph Anderson, and Joseph Donald Pleshek, said application being hereby incorporated by reference in its entirety. In highly secure embodiments, it is contemplated that the scent formulation information is not directly known to the token manufacture or to the enterprise, but is known only to the database application service provider and/or the token manufacturer. Forgery of a token becomes exceedingly difficult, because a forger would require information and equipment not only for application of the scent formulation information to a substrate but also as to the particular code or combination of scents expressed as the scent formulation information for the particular enterprise. In such embodiments, the enterprise may be provided with a reader for obtaining scent formulation information from a token manufacturer. The enterprise may communicate directly with the application service provider after reading scent formulations information from a token for data comparison proposes. Alternately, or in addition thereto, the database application service provider may provide periodically a new set of scent formulation information to the enterprises; for instance, the scent formulation information encoded on airline ticket may be expected to change monthly.

Figure 2:
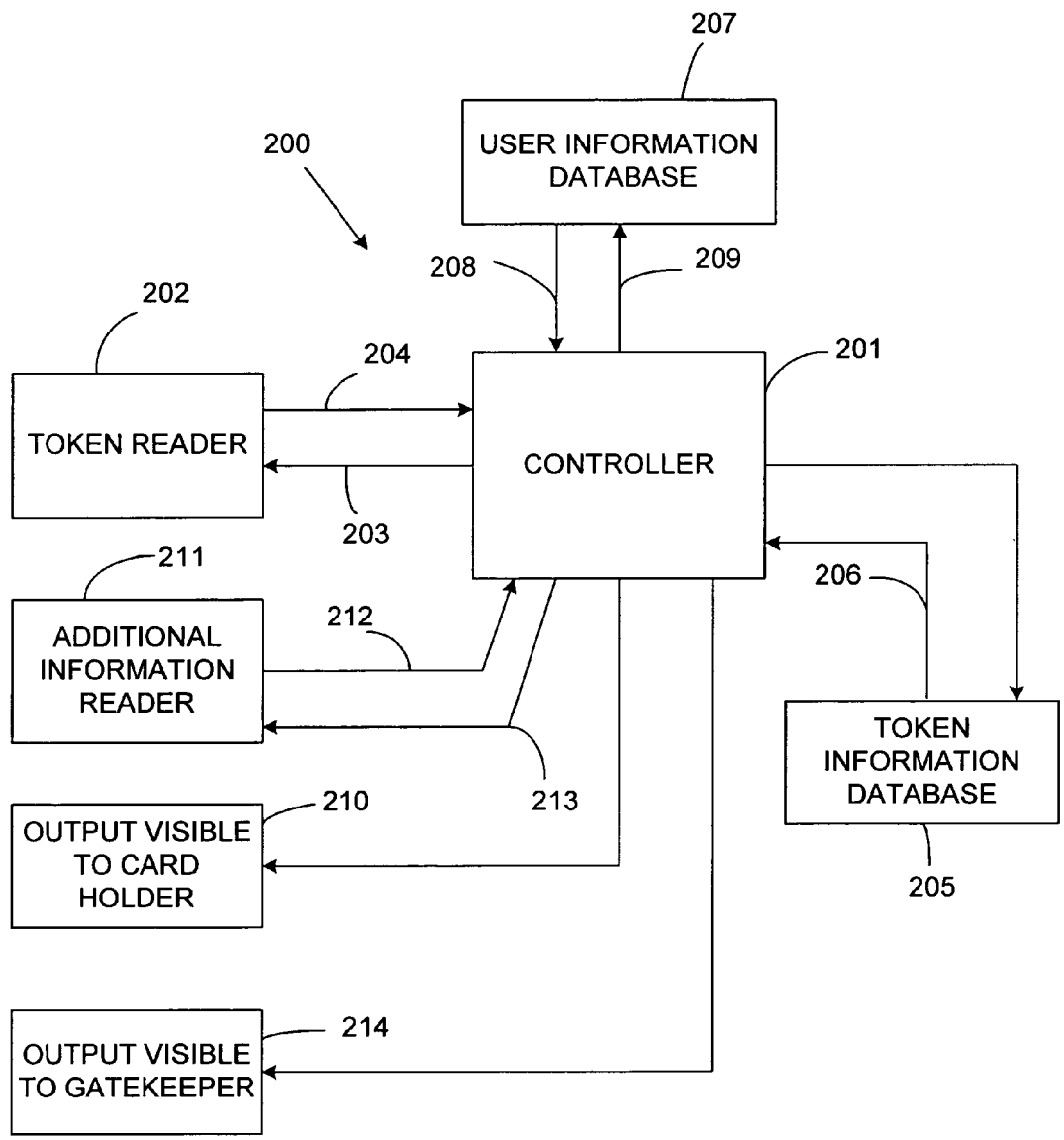
FIG. 2 is a representation of a system useful in conjunction with obtaining scent formulation information from an authentication token.

The enterprise may employ a system such as system 200 shown in FIG. 2. The system includes a controller 201, which may be any micro-controller, micro-processor, computer or like device and which typically is provided with read-only memory (ROM), random-access memory (RAM), storage (such as a disk drive or like storage means), and numerous input/output (I/O) devices such as a monitor, access control devices, alarms, and the like. The token reader 202 communicates with the controller via the communications 203, 204. In this figure, the communication are shown via separate arrows, but this is not intended to signify any structure, and it is contemplated, for instance, that the communication may take place via a data bus or other device. Upon receipt of a token, scent formulation information and possibly other information obtained from the token is conveyed to the controller.

Figure 4:
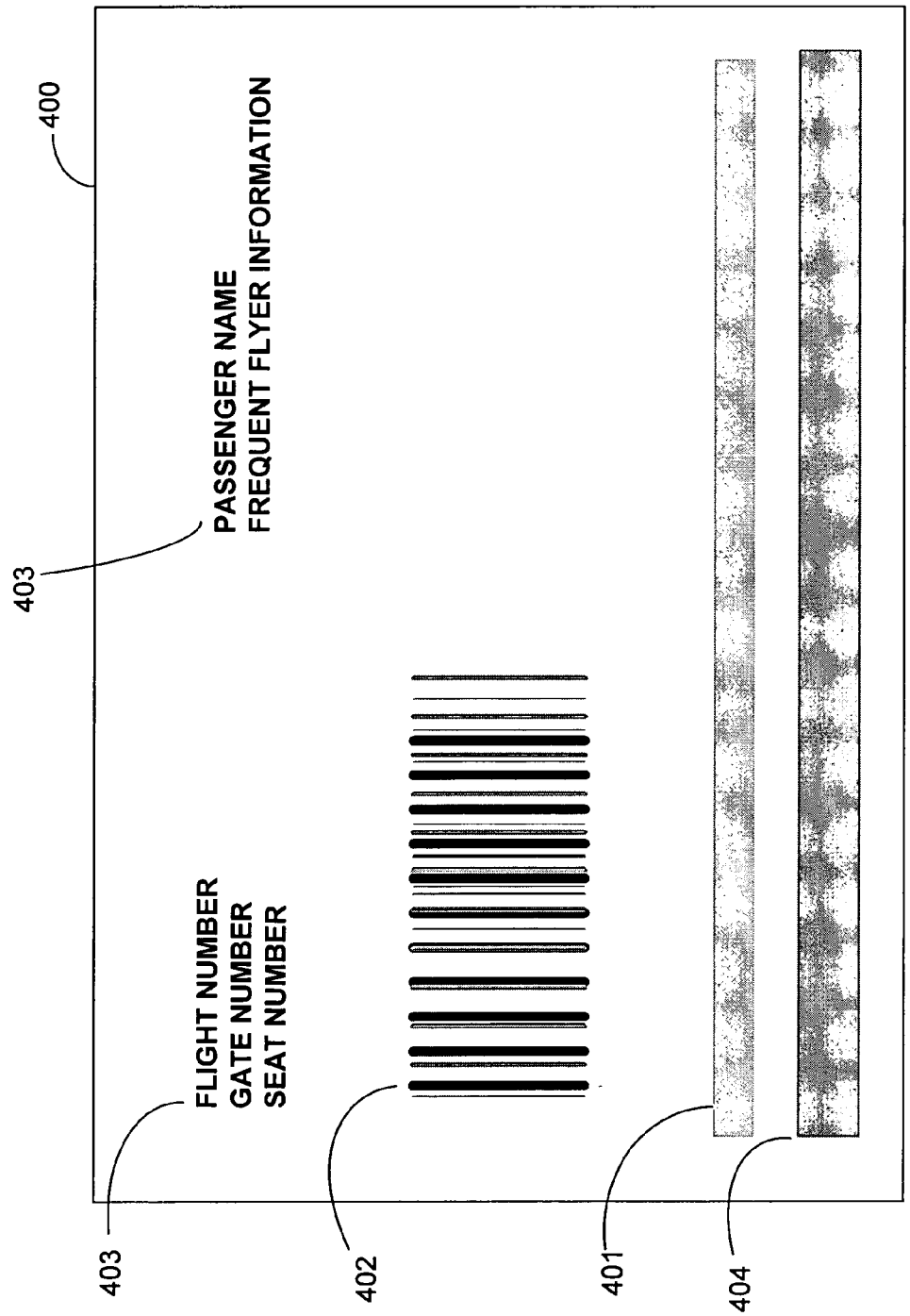
FIG. 4 is a plan view of an authentication token in the form of an idealized airline ticket that bears scent formulation information and information that is otherwise encoded.

For instance, the token may comprise an airline ticket, such as ticket 400 shown in FIG. 4. In this Figure, the scent formulation information is contained on a scent strip 401. The airline ticket contains machine-reader visible indicia, in the form of barcode 402. It is contemplated that the textual indicia 403 also may be readable via OCR by the reader. The illustrated ticket contains a magnetic strip 404 that includes magnetically encoded information. This information is read by the reader and electronic signals corresponding to the information read are conveyed to the controller via communication 204. The controller processes the information, optionally by communication with token information database 205, which is a database that contains sufficient to authenticate the token. Upon receipt of a database record via communication 206, the controller registers the passenger by communicating with user information database 207 via communications 208, 209. The controller may generate an output 210 visible to the ticket holder, for instance, a green light signifying that the ticket has been properly processed. If the ticket is not found to be genuine, the output may be a red light indicating a problem with the ticket.

Figure 5:
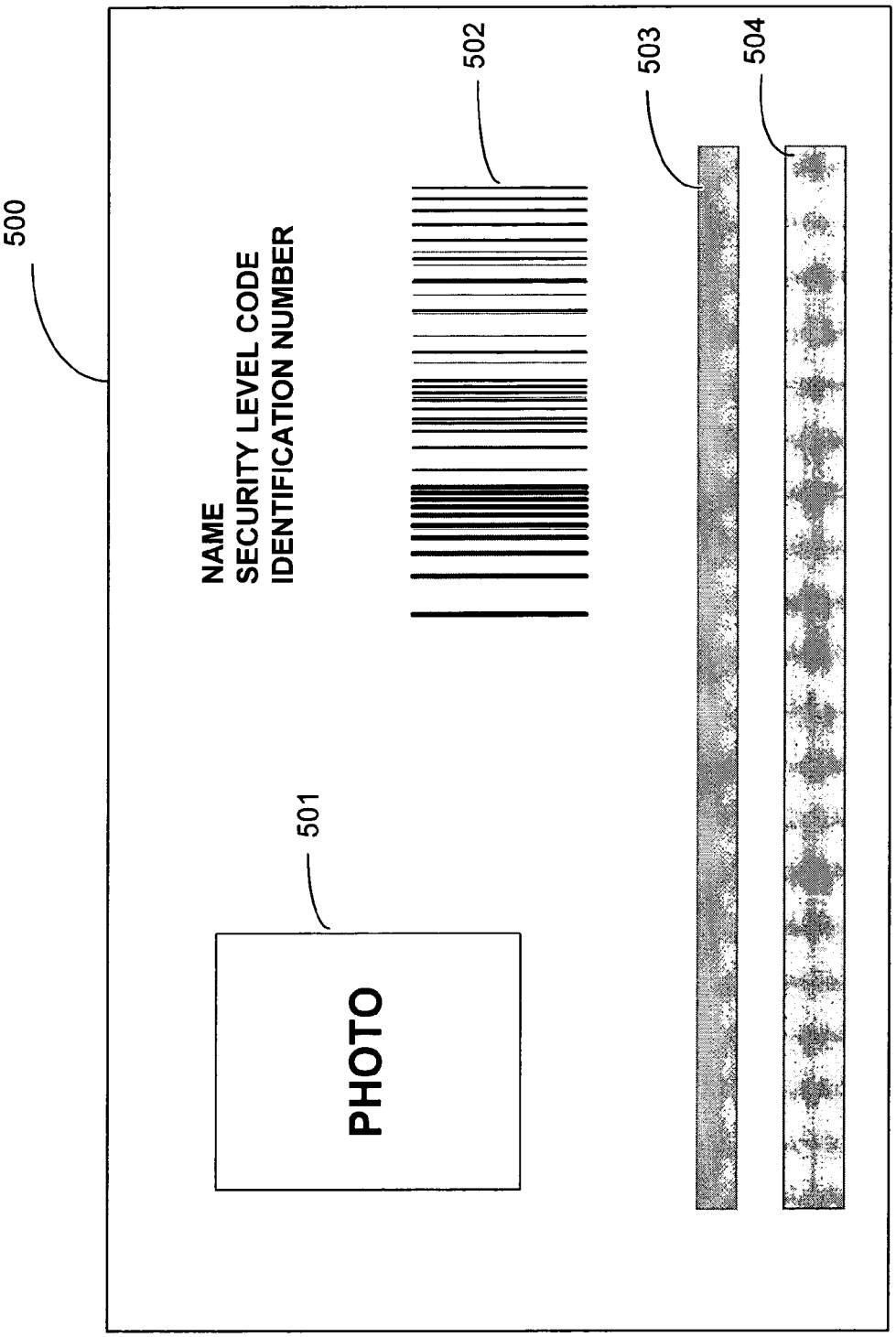
FIG. 5 is a plan view of an authentication token in the form of an idealized security badge that bears scent formulation information and information that is otherwise encoded.

In another application, with reference to the security badge 500 illustrated in FIG. 5, this badge includes the user's photo 501 in addition to a barcode, 502 a scent strip 503 that includes scent formulation information, and a magnetic strip 504. If the user desires to enter a secure facility, for instance, the user may present the token to the token reader, whereby the scent formulation information and any other information is obtained in the card and communicated to the controller. The system may be provided with additional information reader 211, which may be, for instance, a keypad for receiving input of a users personal identification number or input code. This information is communicated to the controller via communications 212, 213. The controller may verify the authenticity of the token via reference to token information database 205 and may log the user as having entered the facility in user information database 207. The controller may generate two forms of output, one visible to the user and one visible to the gatekeeper (see 214), which may be, for instance, a security guard. Thus, for instance, if the user presents a token that is invalid, the output that is visible to the gatekeeper may or may not be visible to the person presenting the badge. FIG. 2 is highly idealized, and numerous alterations and additions are possible. It is conceivable, for instance, that the token information database and user information database may be integrated. It is likewise envisioned that numerous components may be added to such a system.

Figure 6:
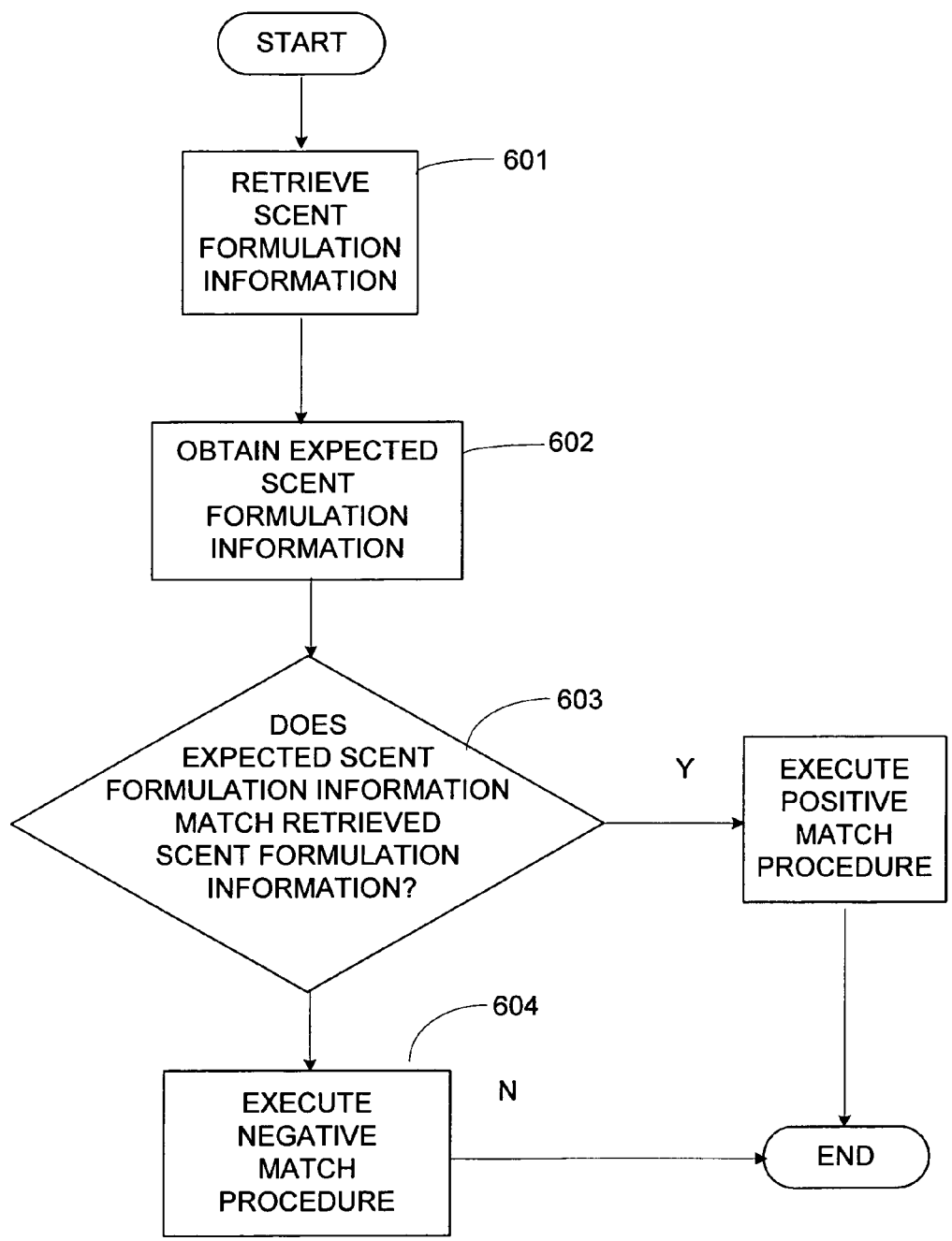
FIG. 6 is a flowchart representation of a method for determining whether to execute a positive match procedure.

A general methodology for authenticating a token is illustrated in FIG. 6. In this and other flowcharts, the steps shown may be preformed in any appropriate order, other steps may be added or omitted as may be appropriate. The scent formulation information is retrieved from a token at step 601, generally via the use of a token reader. Expected scent formulation information is also obtained at step 602. If, at step 603, it is determined that the scent formulation information does match the scent formulation information actually retrieved, a positive match procedure is executed. A positive match procedure may be any suitable procedure, such as allowing a passenger to board the airplane or allowing a user into a secure facility. As further discussed in copending application Ser. No. 10/377,534 referred to hereinabove, the positive match procedure may be allowing access to a database for purposes of modifying the information contained in the database or for other purposes such as verifying authenticity or tracking of items. If the expected scent formulation information does not match the actual scent formulation information, at step 604 a negative match procedure is executed. This again may be any suitable procedure, such the user or passenger to additional scrutiny, denying the user or passenger permission to proceed further, or subjecting the user or passenger to additional security measures. For instance, as discussed in copending application Ser. No. 10/377,534 referred to hereinabove, the negative match procedure may be an act of sending a fraud alert.

Figure 7:
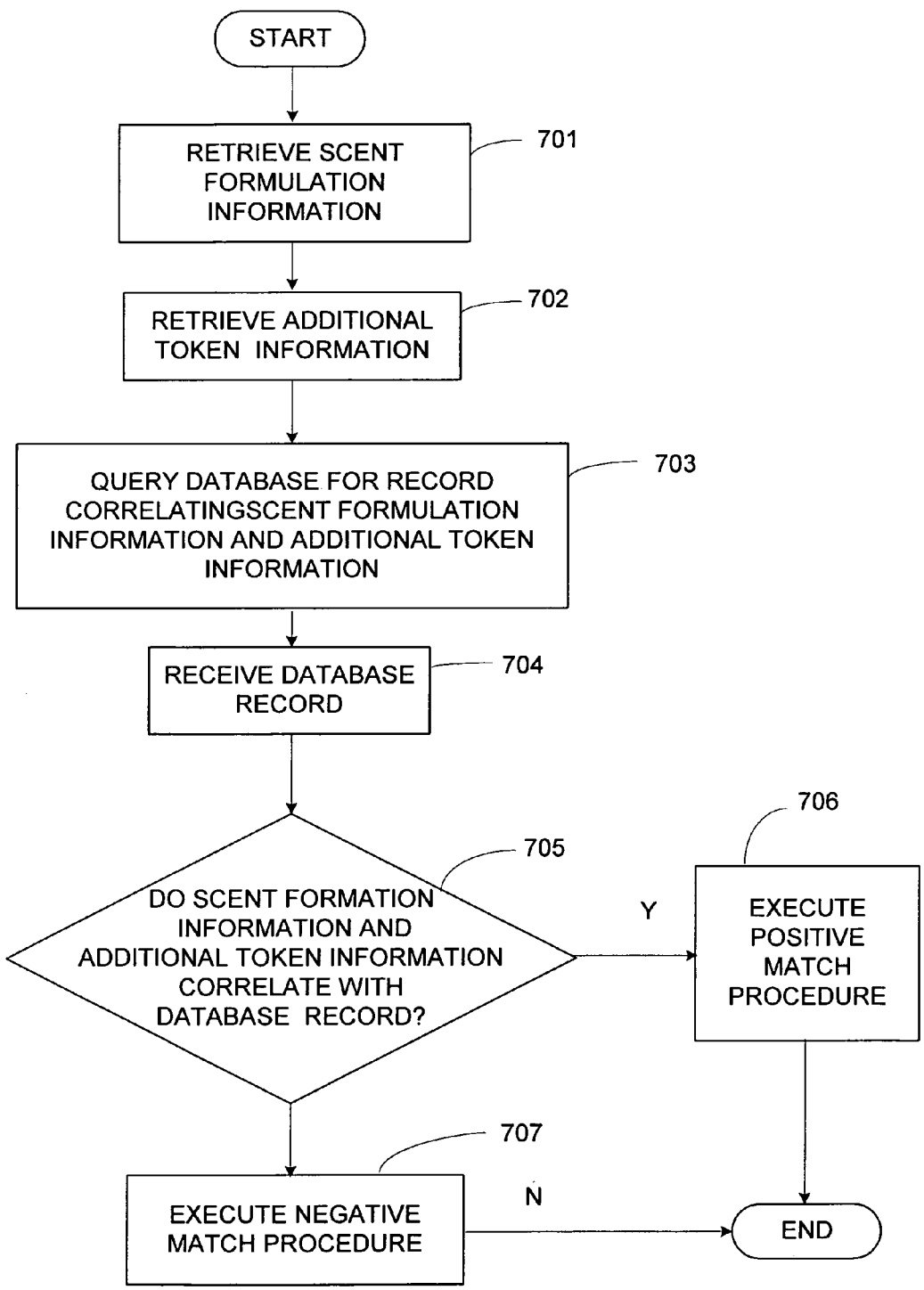
FIG. 7 is a flowchart representation of another method for determining whether to execute a positive match procedure.
Figure 8:
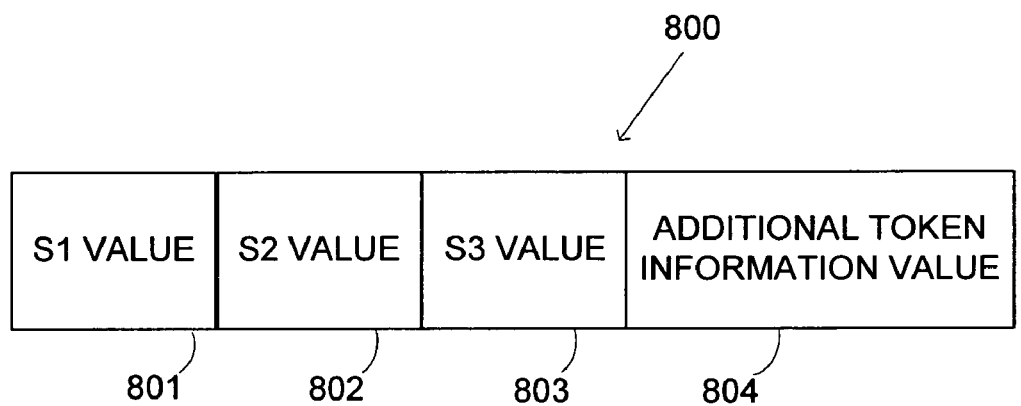
FIG. 8 is a representation of a database record useful in conjunction with the method of FIG. 7.

As shown in FIG. 7, when the token is provided with additional token information, such as a barcode or magnetic strip, at step 701 scent formulation information is retrieved, and at step 702 additional token information is retrieved (for instance, by scanning the barcode). It is contemplated that these steps may be performed in a reverse or in other appropriate order. In step 703, a database is queried for a record that correlates to the scent formulation information and the additional token information. This record is received at step 704. If, at step 705, it is determined that the scent formulation information and additional token information correlate, the positive match procedure is executed at step 706. If, on the other hand, the scent formulation information and additional token information do not correlate with the database record, at step 707 a negative match procedure is executed. For instance, each airline may be provided with a batch of tickets each bearing identical scent formulation information. Information concerning the airline also may be encoded onto the token via the barcode or magnetic strip. At step 703, the database may be queried to determine whether the airline corresponding to the scent formulation information is identical to that expected via the barcode. As shown in FIG. 8, for instance, for a 3-component scent formulation, the three database values 801, 802, 803 may be included in the database record 800 along with additional token information value 804.

Figure 9:
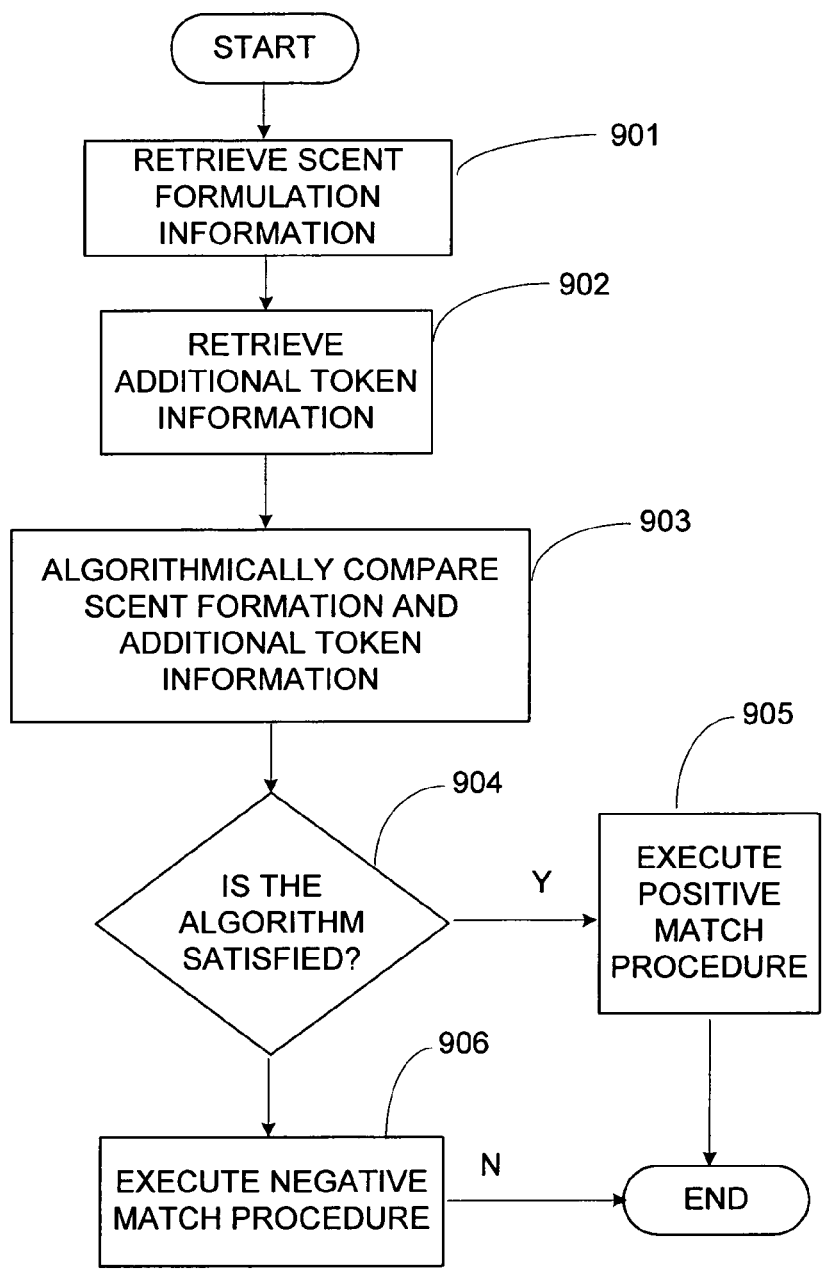
FIG. 9 is a flowchart representation of another method for determining whether to execute a positive match procedure.

It is contemplated in some embodiments that the scent formulation may be algorithmically compared to the additional token information to determine whether there is a match. In such embodiment, a database optionally may be employed to verify the match or to determine whether other correlations are satisfied. In FIG. 9, for instance, scent formulation is retrieved from a token at step 901, and additional token information is received at step 902. At step 903, additional token information and scent formulation information are algorithmically compared. The algorithm may be a simple algorithm, for instance, the same code may be provided both via a barcode and via scent formulation information, and the algorithm may be as simple as determining whether or not the same code is present. Alternately, significantly more complicated algorithms may be employed. If, at step 904, it is determined that the algorithm is satisfied, the positive match procedure may be executed at step 905. Conversely, if the algorithm is not satisfied, the negative match procedure may be executed at step 906.

Figure 10:
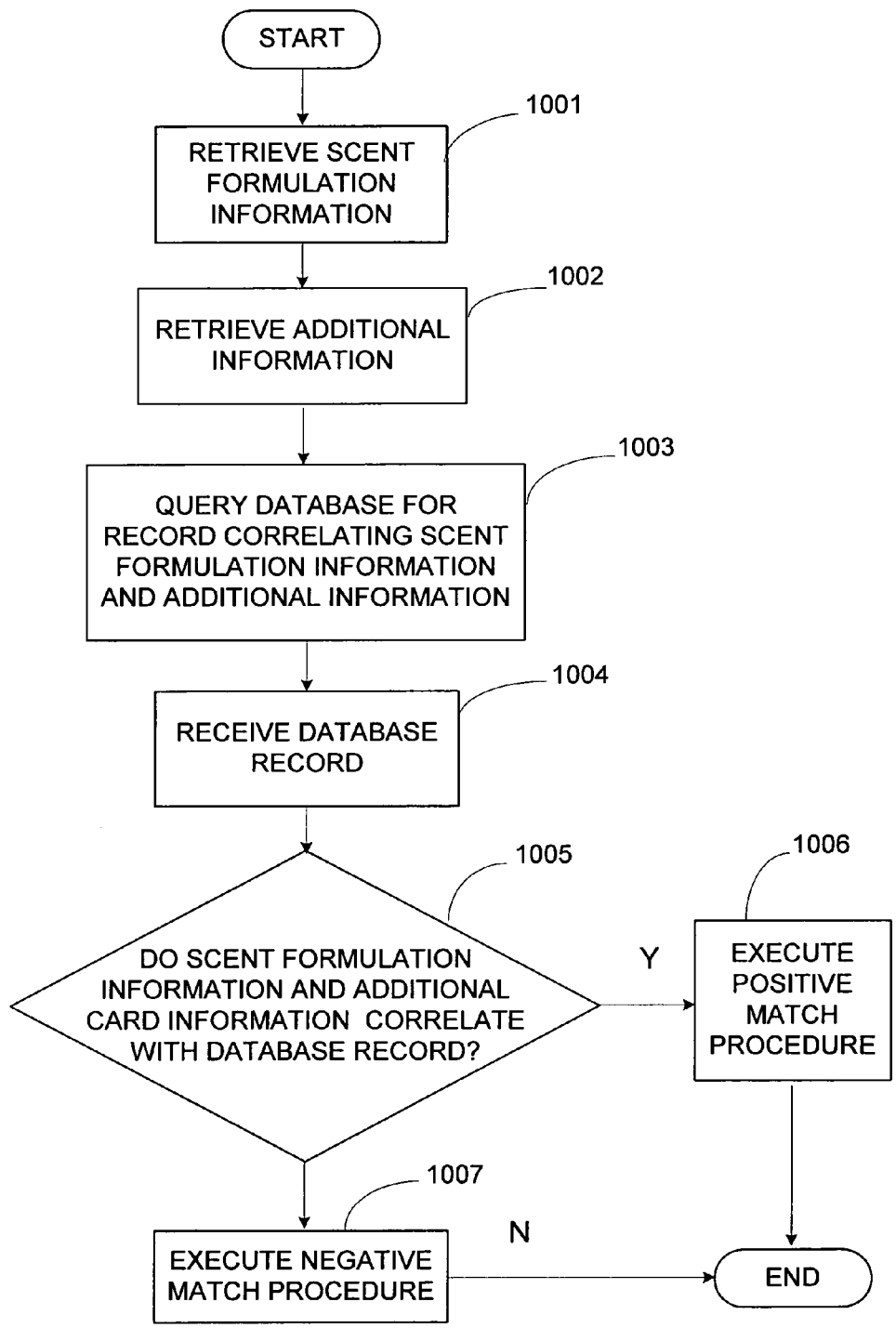
FIG. 10 is a flowchart representation of another method for determining whether to execute a positive match procedure.
Figure 12:
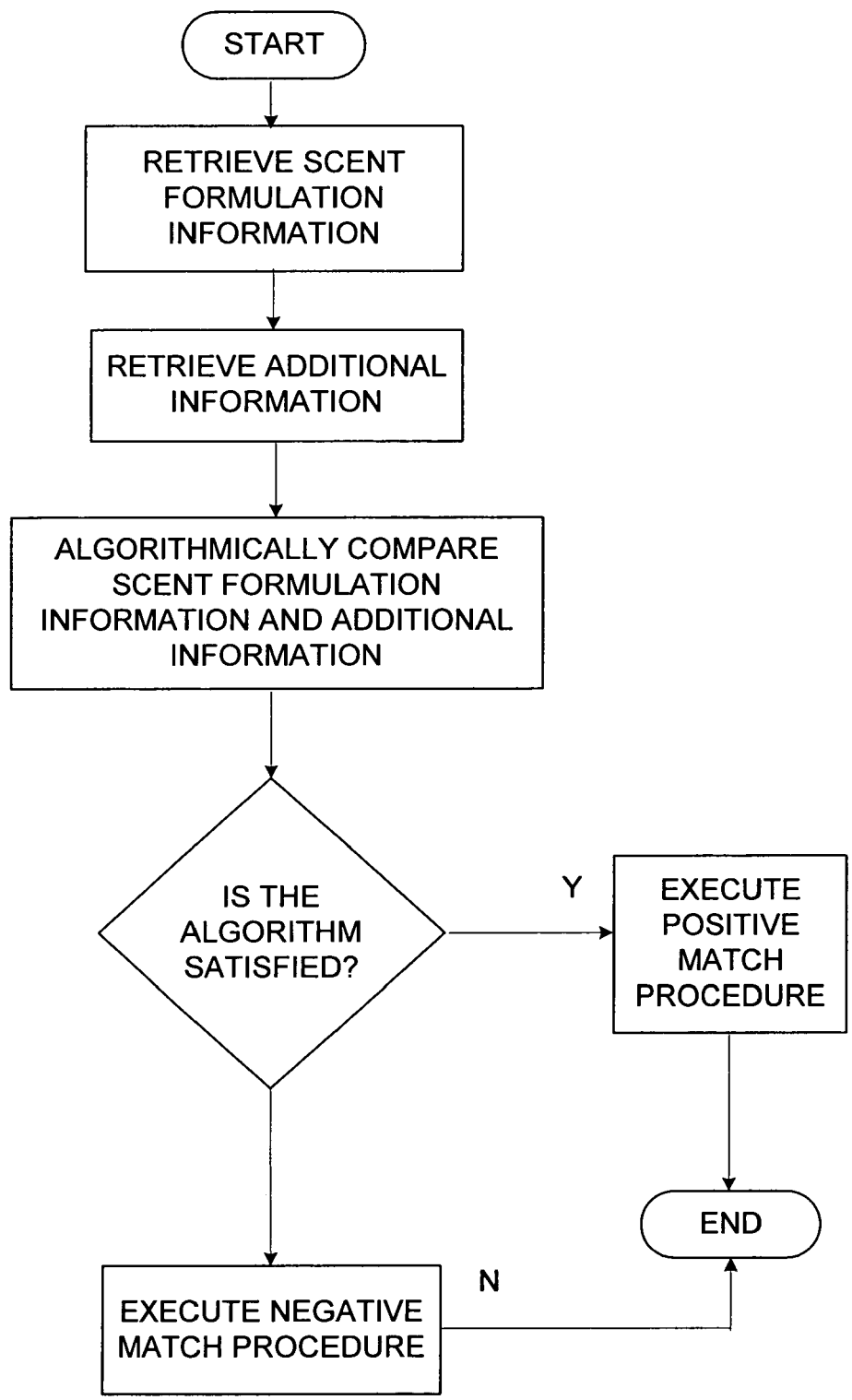
FIG. 12 is a flowchart representation of a method for determining whether to execute a positive match procedure.

The system may employ a reader for obtaining additional information, which is contemplated to be any information not obtained directly from the token. For instance, the user may be required to input a personal identification number. In FIG. 10, at step 1001, scent formulation information is retrieved, and at step 1002, the additional information is retrieved. At step 1003 a database is queried for a record that correlate the scent formulation information and the additional information, which record is received at step 1004. If, at step 1005, the scent formulation information and additional information are determined to correlate with the database record, the positive match procedure is executed at step 1006. If there is no correlation, the negative match procedure is executed at step 1007. The scent formulation information and additional information may be included in a database record 1100, shown FIG. 11. As before, the additional information and scent formulation information may be algorithmically compared, for instance, as shown in the method outlined in FIG. 12, which is otherwise similar to that shown in FIG. 10.

Figure 13:
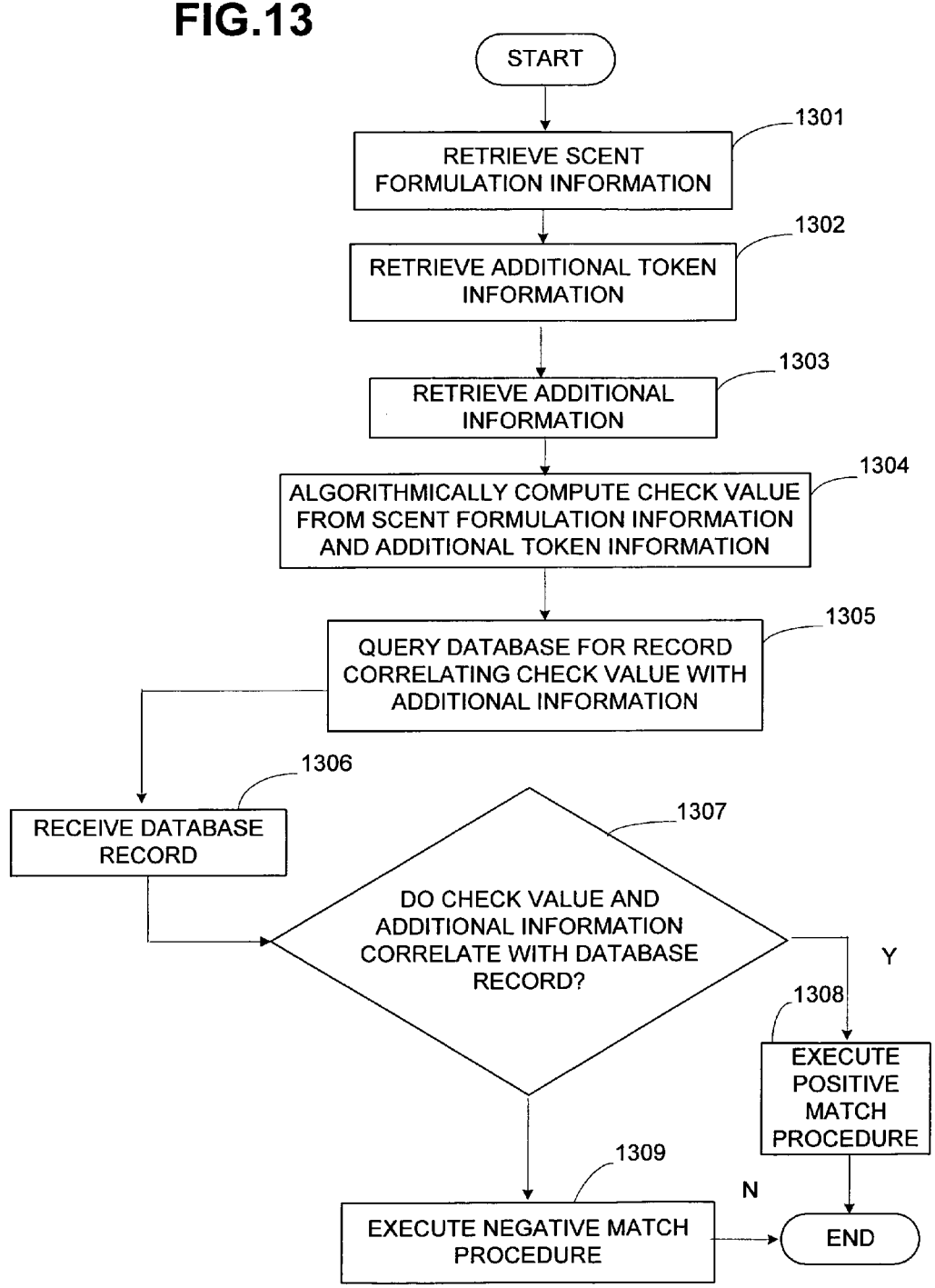
FIG. 13 is a flowchart representation of another method for determining whether to execute a positive match procedure.
Figure 15:
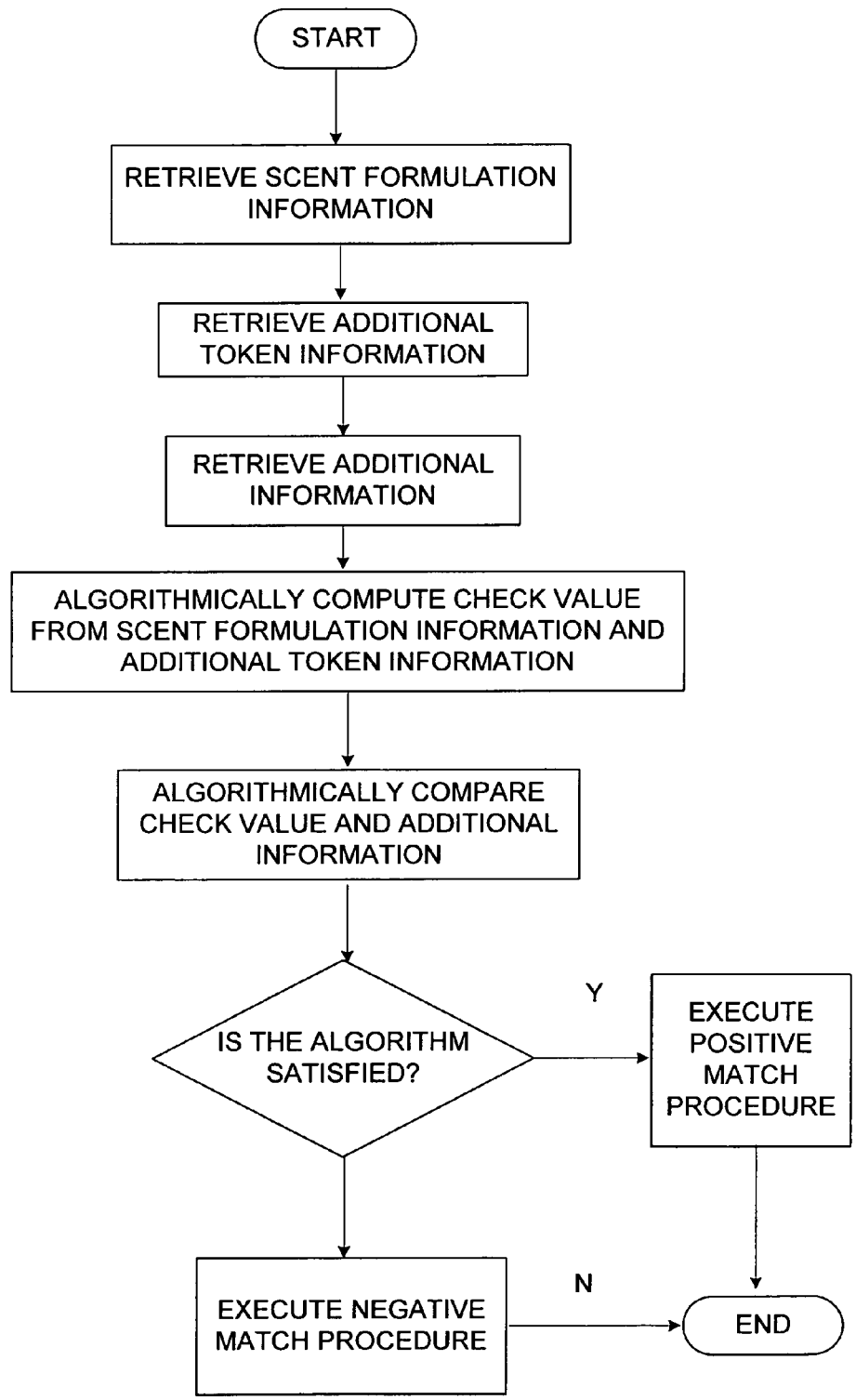
FIG. 15 is a flowchart representation of another method for determining whether to execute a positive match procedure.

A database and algorithm computation may be employed together in the same method, as illustrated, for instance, in FIG. 13. At step 1301, scent formulation information is retrieved, and additional token information is retrieved at step 1302. Additional information, such as a personal identification number, is retrieved at step 1303. A check value is algorithmically computed from the scent formulation information and the additional token information is retrieved at step 1304. A database (such as a database containing the record 1400 shown in FIG. 14) is queried at step 1305 for a record correlating the check value with the additional information. The database record is received at step 1306. If, at step 1307, the check value and the additional information are found to correlate, a positive match procedure is executed at step 1308; if not, a negative match procedure is executed at step 1309. Likewise, multiple algorithms may be employed with connection with an authentication method, as illustrated, for instance, in FIG. 15.

Figure 16:
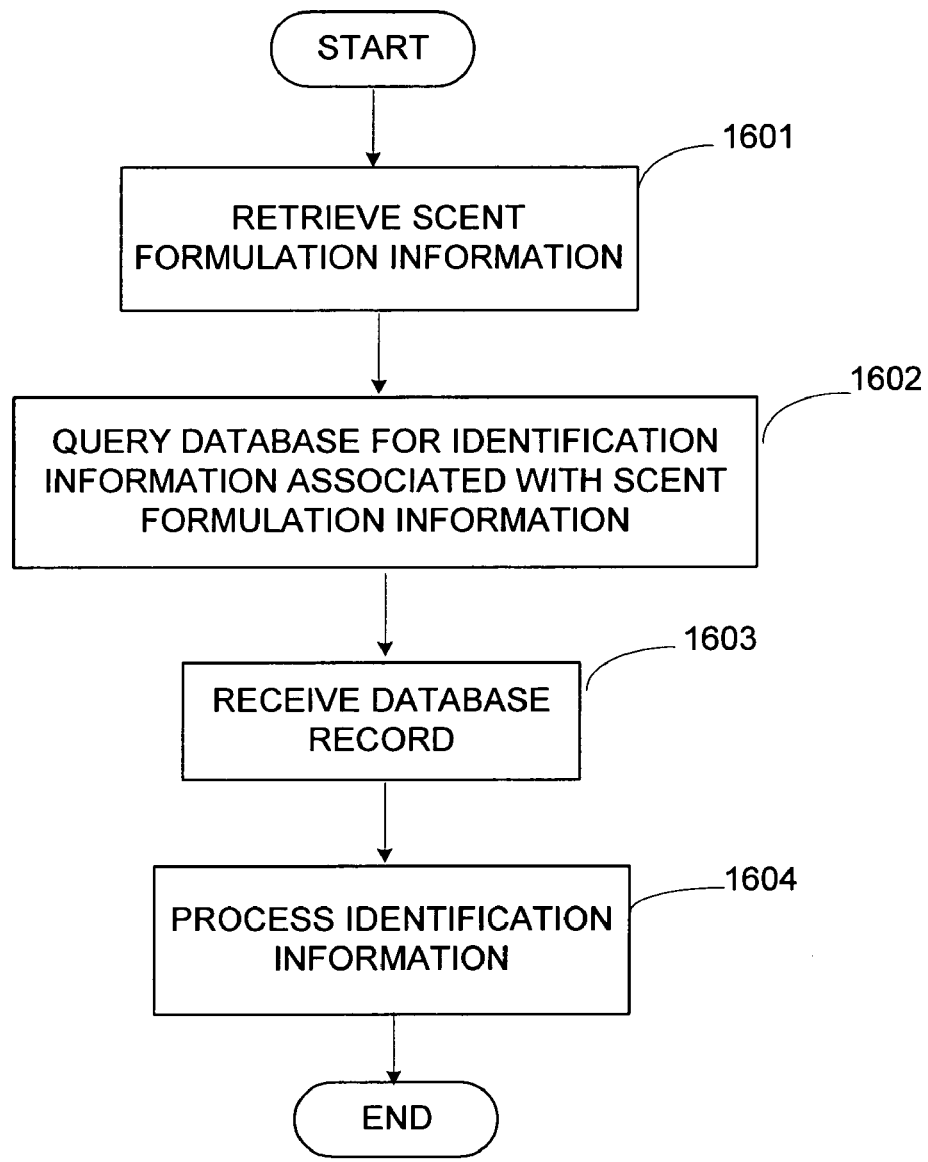
FIG. 16 is a flowchart representation of a method for processing identification information.

FIG. 16 contemplates a method wherein identification information is associated with scent formulation information on a token the identification information being, for instance, a user's hotel room number. The token, for instance, may be a hotel services card, and the user may use the token, for instance, to purchase goods and services as a guest at the hotel. At step 1601, scent formulation is retrieved from the token, and at step 1602 a database is queried for identification information associated with the scent formulation information. The database record is received at step 1603, and the identification information is processed at step 1604. The processing of the identification information may encompass, for instance, charging of goods purchased at the hotel to the user's room or account.

Figure 17:
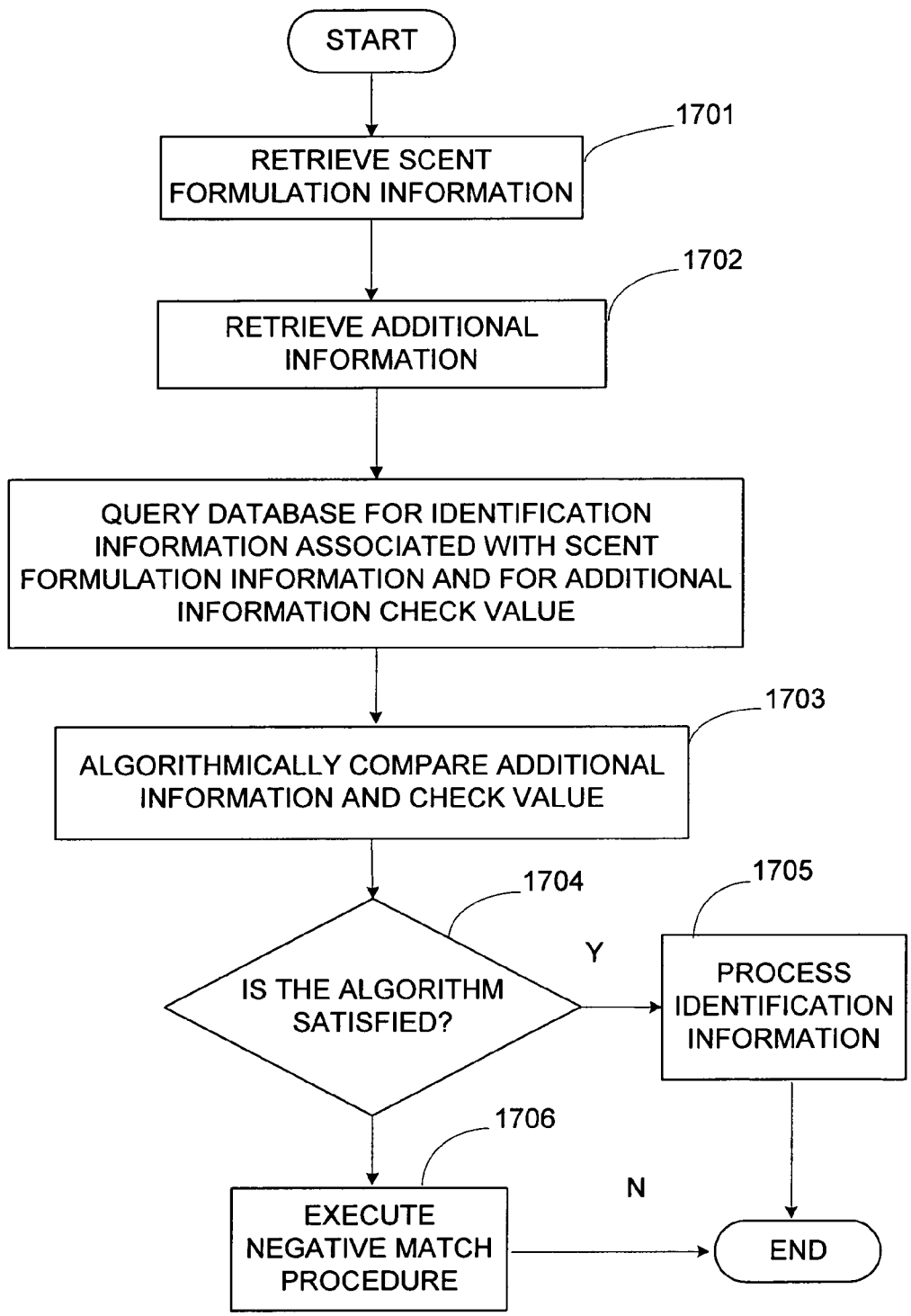
FIG. 17 is a flowchart representation of a method for processing identification information.
Figure 18:
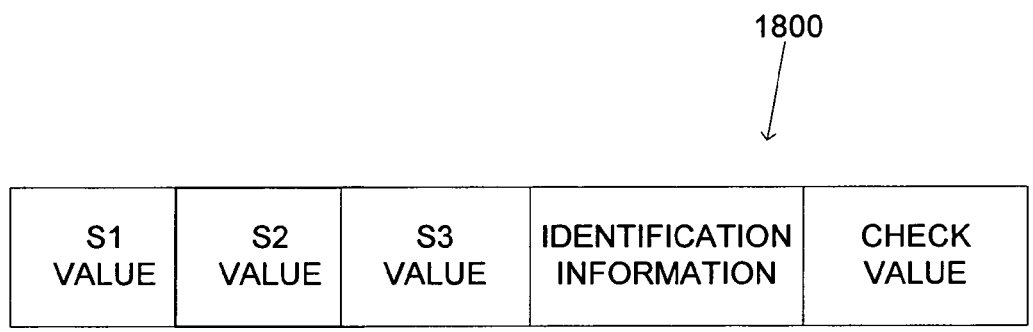
FIG. 18 is a representation of a database record useful in conjunction with the method of FIG. 17.

The method outlined in FIG. 17 provides a more secure method for processing identification information. Scent formulation information is retrieved at step 1701, and additional information, such as a pass code, is received at step 1702. A database (such as a database containing a record 1800 shown in FIG. 18) is queried for identification information that is associated with scent formulation information and for an additional information check value. At step 1703, the additional information and check value are algorithmically compared. Again, the algorithm may be as simple as determining whether the additional information is identical to the check value, or a more complex algorithm may be employed. If, at step 1704, the algorithm is satisfied, the identification information is processed at step 1705. If the algorithm is not satisfied, the transaction is deemed a negative match in a negative match procedure is executed at step 1706.

Figure 19:
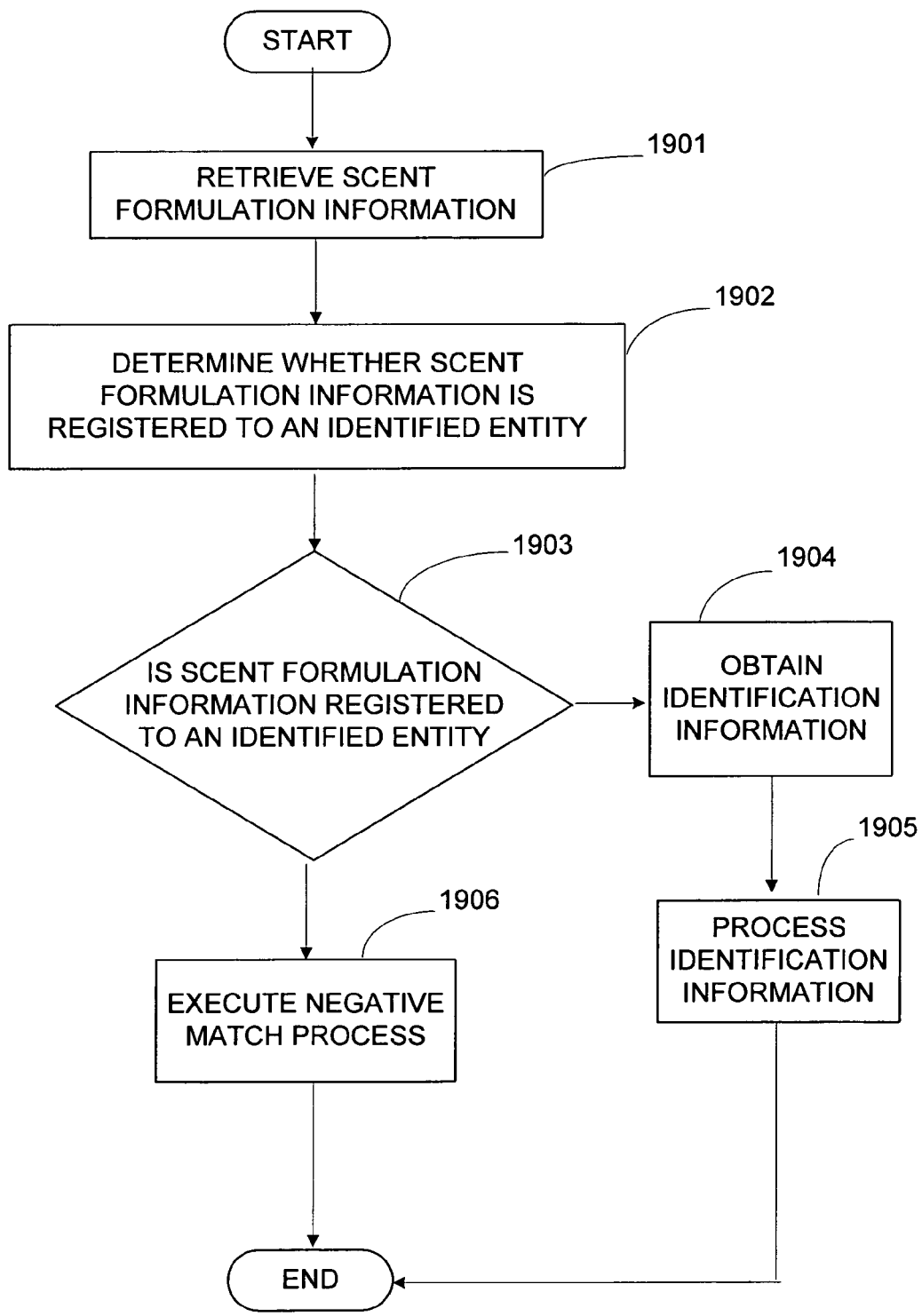
FIG. 19 is a flowchart representation of a method for processing identification information.

It may be necessary in some instance to determine whether the scent formulation information on a token is registered to identified entity. For instance, in a warehouse tracking system, packages may bear a token that represents some information concerning a package, such as tracking number, destination, owner, storage location, or the like. An operator may encounter a package whose registration status in the warehousing system is unknown. The operator may scan the package and retrieve scent formulation information from the package to thereby determine whether the package need be enrolled in the system or is already enrolled in the system. For instance, at step 1901 in FIG. 19, scent formulation is retrieved from the token, and, at step 1902, it is determined whether scent formulation information is registered to an identified entity. If, at step 1903, it is determined that the scent formulation information is registered to an identified entity, control passes to step 1904, wherein identification information is obtained and, at step 1905, is processed. For instance, if the package is determined to be enrolled in the system the operator may forward the package to the appropriate destination. If, at step 1903, the scent formulation information is not deemed to be registered to an identified entity, a negative match process is executed at step 1907. The negative match process may be any suitable process, such as enrolling the package into the system, rejecting the package, identifying the package as questionable or suspect, and so forth.

Figure 20:
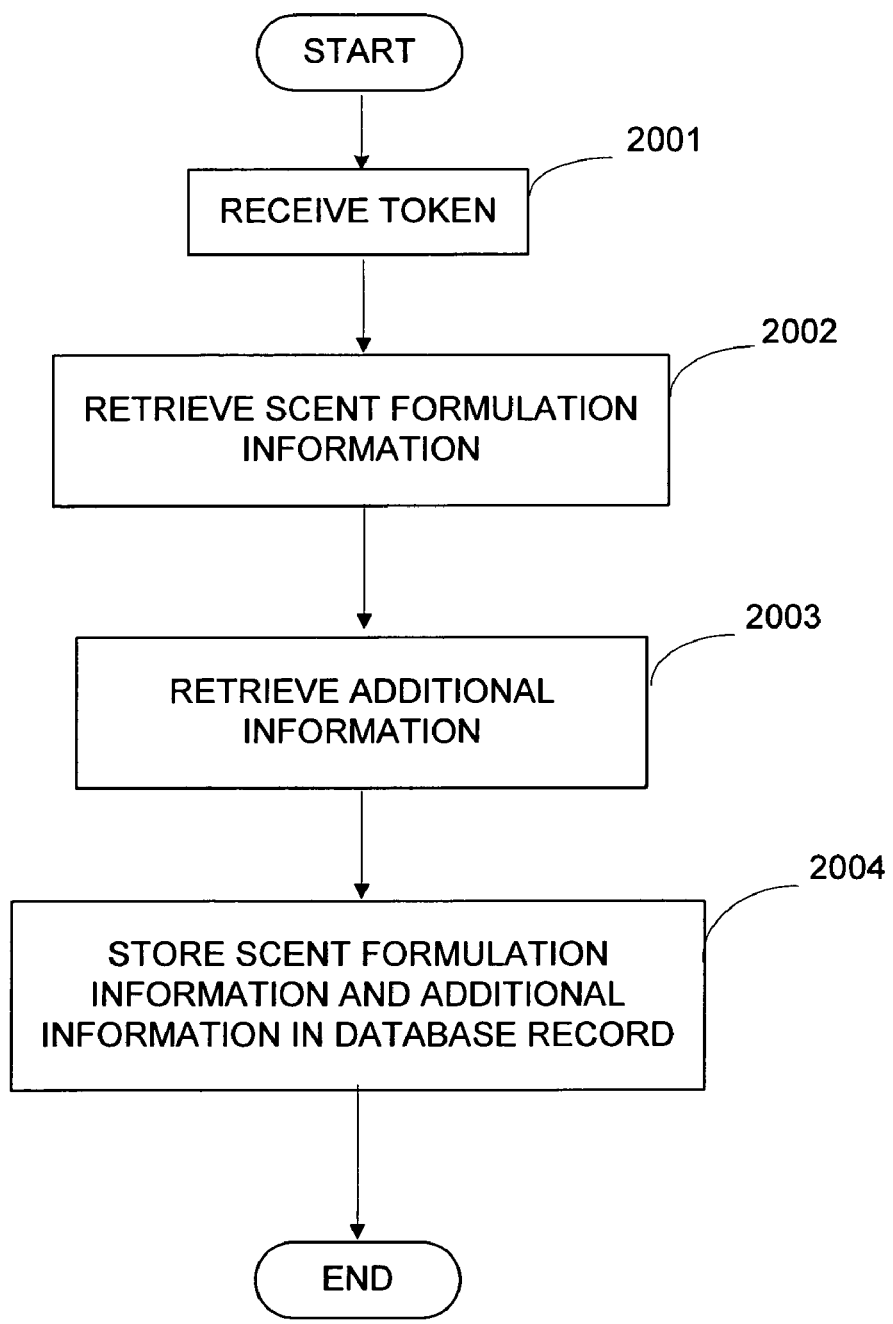
FIG. 20 is a flowchart representation of a method for storing scent formulation information in a database record.
Figure 21:
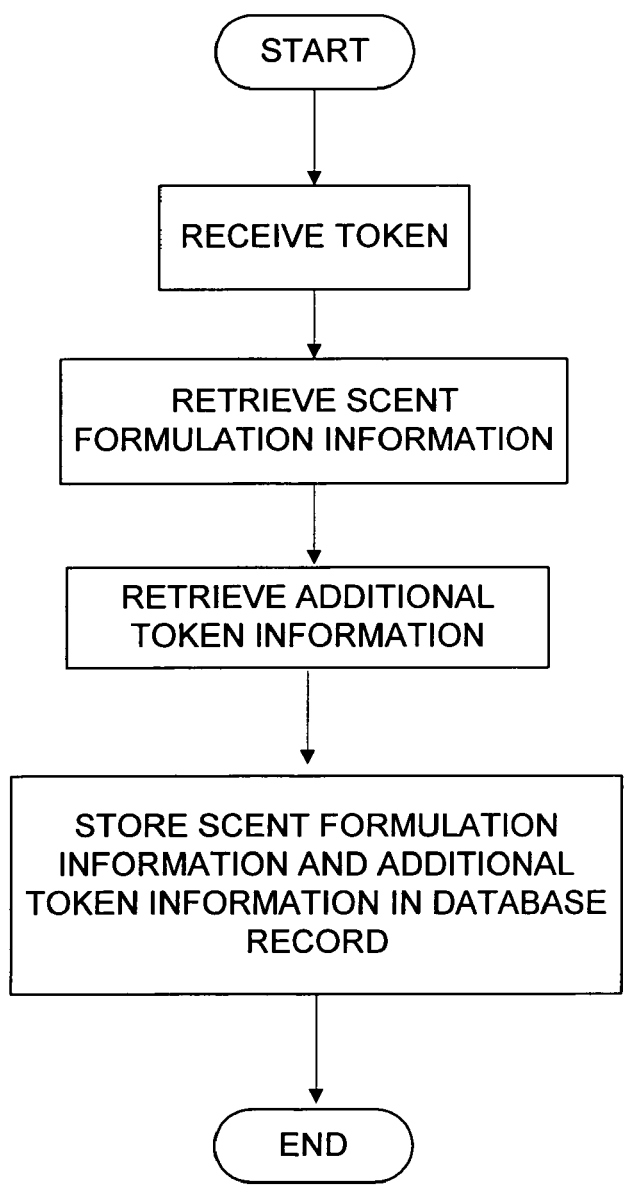
FIG. 21 is a flowchart representation of a method for storing scent formulation and additional information in a database record.
Figure 22:
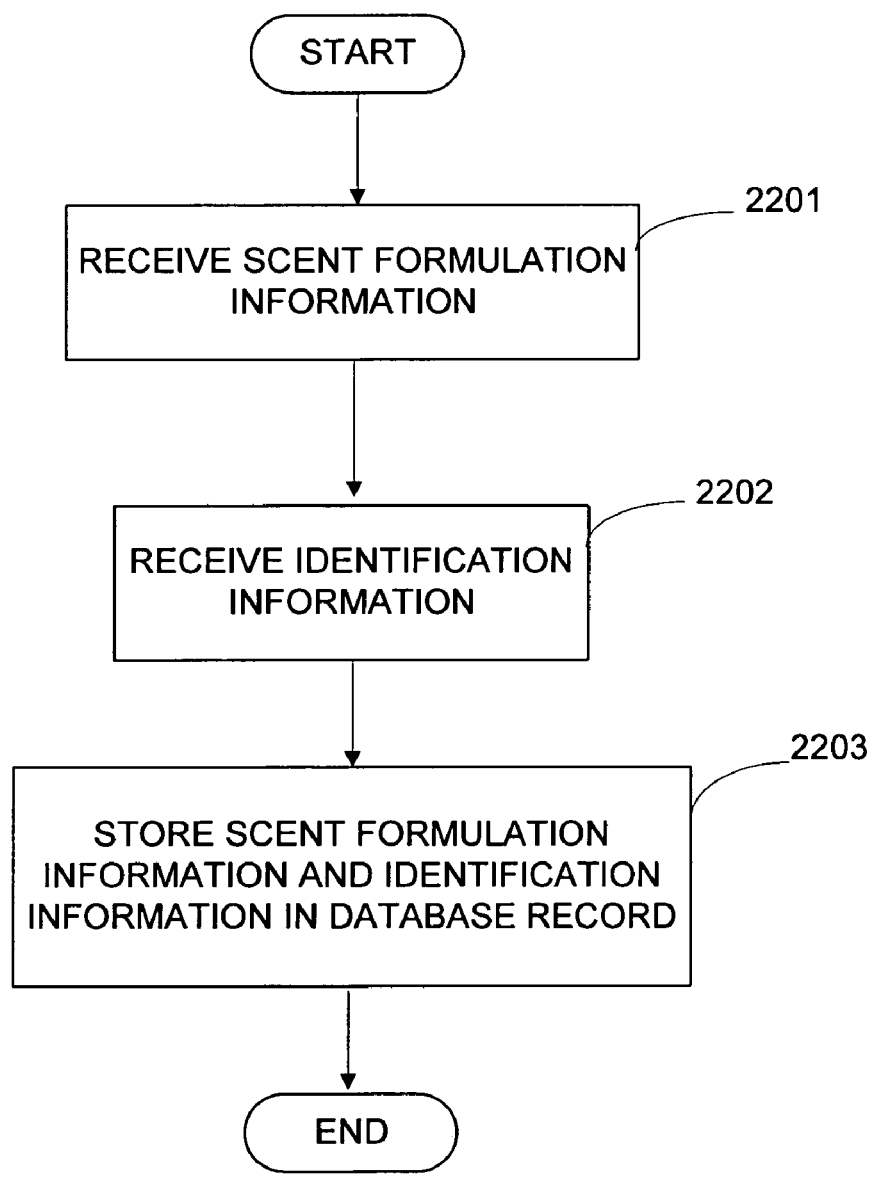
FIG. 22 is flowchart representation of a method for storing scent formulation information and identification information in a database record.
Figure 23:
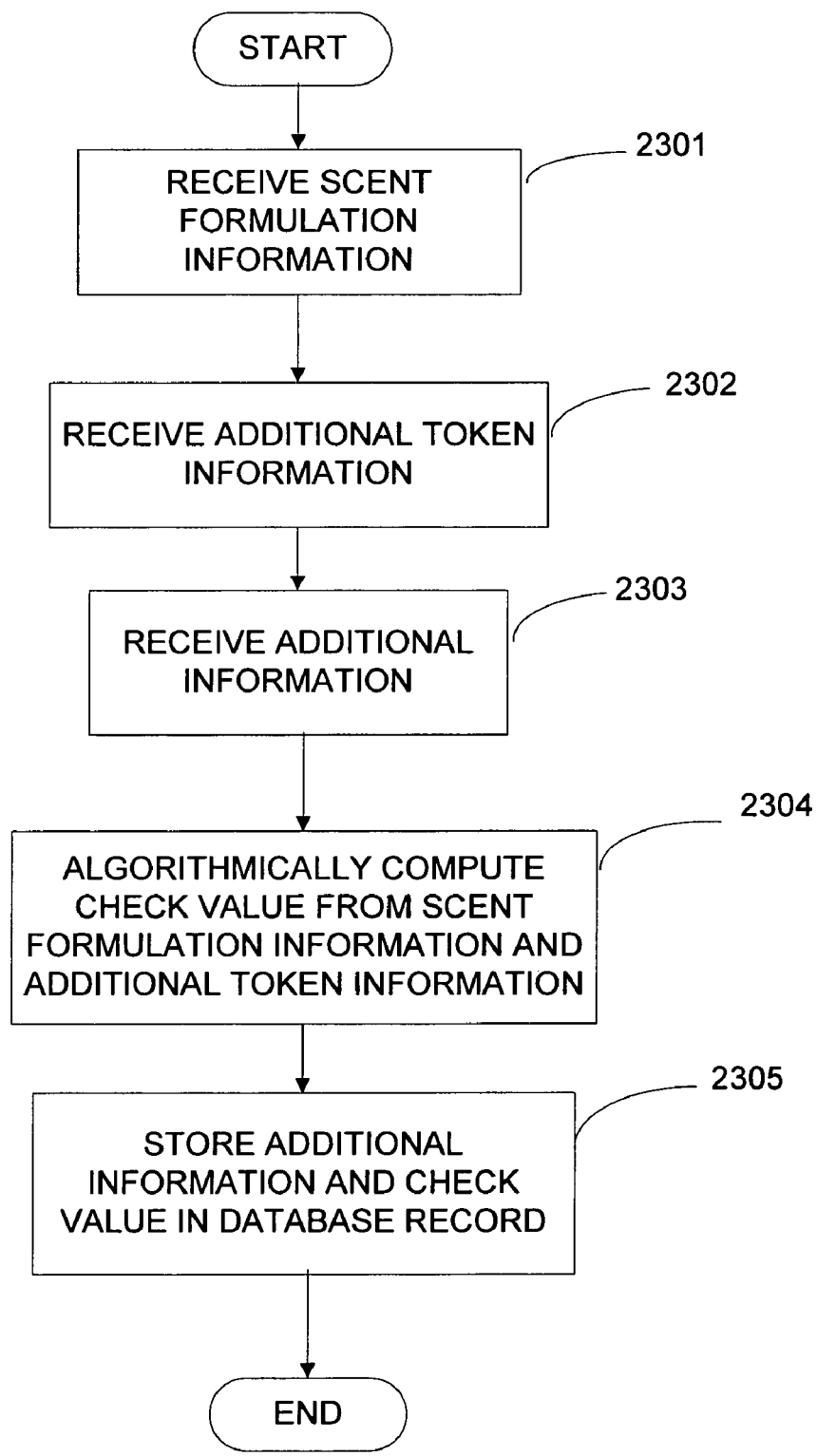
FIG. 23 is flowchart representation of a method for storing additional information and a check value in a database record.
Figure 24:
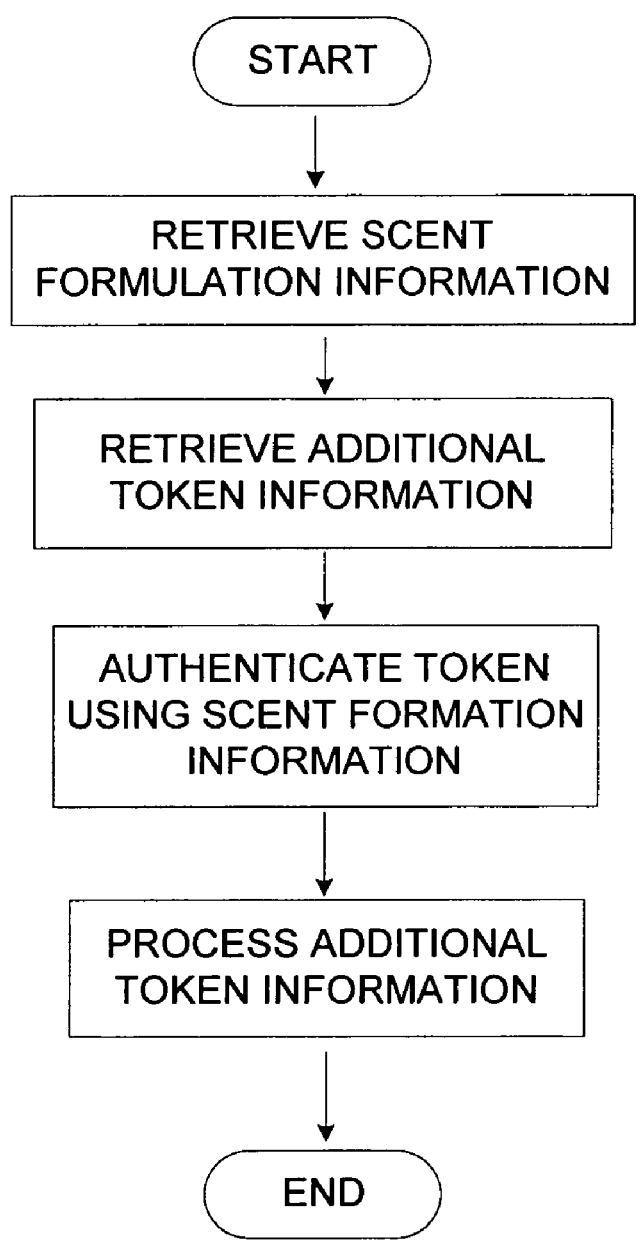
FIG. 24 is flowchart representation of a method for processing additional token information.

Certain entities in the authentication environment may need to enroll a token into an authentication system. For instance, as shown in FIG. 20, a token may be received at step 2001 and scent formulation infonnation retrieved from the token at step 2002. The token may be provided with additional token information, such as a unique token identifying number. This additional token information is retrieved at step 2003, and is stored in database at step 2004. Likewise, as shown in FIG. 21, additional information and scent formulation information from a token may be stored in a database record. It is possible that the scent formulation information will be known to the entity preparing the database record without the necessity of retrieving the scent formulation information from the token. Thus, as shown in FIG. 22, scent formulation information and identification information may be received at steps 2201 and 2202 respectfully and stored in a database record at step 2203. As shown in FIG. 23, scent formulation information and additional token information, are received at steps 2301, 2302, and 2303 respectfully. A check value is computed from scent formulation information and additional token information at step 2304, and the additional information and check value are stored in a database record at step 2305.

Figure 25:
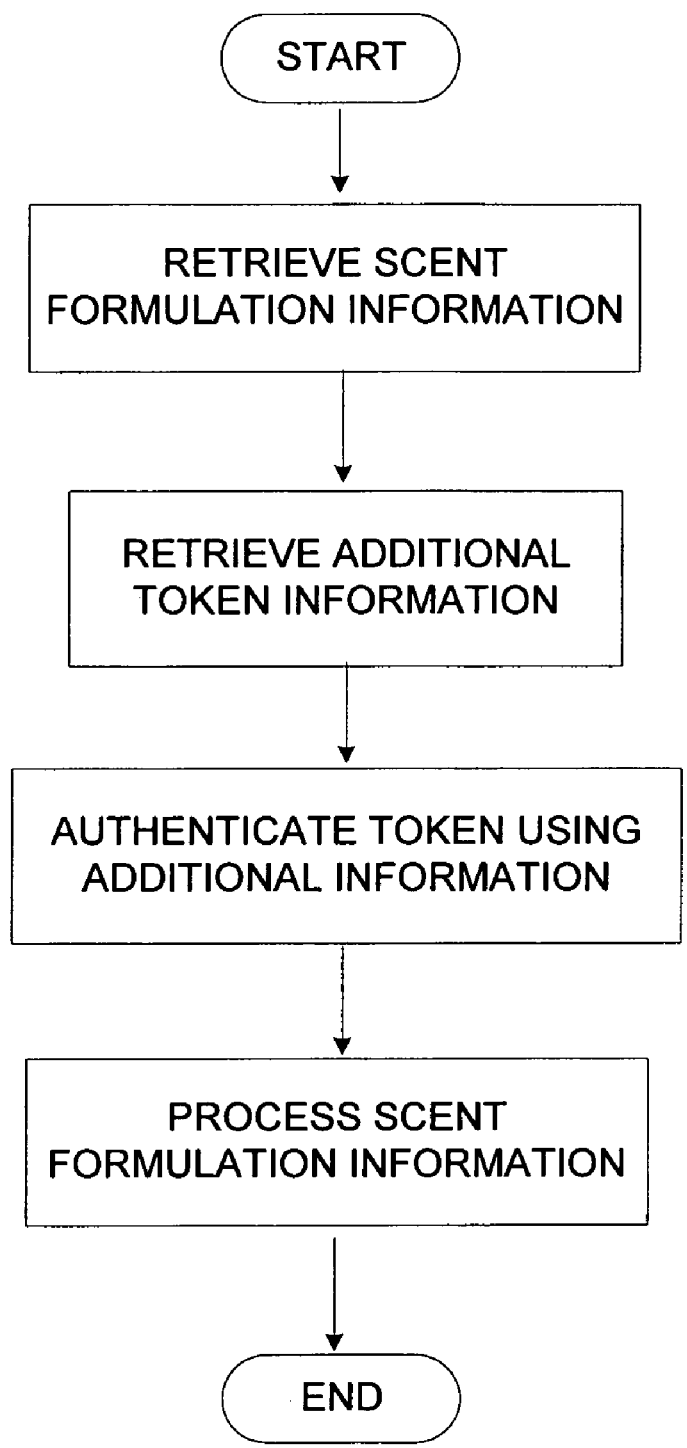
FIG. 25 is a flowchart representation of a method for processing scent formulation information.

The invention is contemplated to be useful in connection with sequential security checks using a token. Thus, for example, a token may be provided with scent formulation information and additional token information (such as a barcode). A reader may be configured to obtain both scent formulation information and barcode information from the token. The reader and associated system may obtain the scent formulation information to verify the authenticity of the token as discussed above, and upon verification, may process the barcode information (e.g. the barcode information may be information as to a hotel account, and the processing of the information may be charging a purchase to the hotel account). The positive match procedure thus may be allowing further information associated with the token to be processed as illustrated in FIG. 25. Alternatively, the methods described above may include when appropriate a step of preauthenticating the token using information associated with said token other than scent formulation information, as illustrated in FIG. 26, and subsequently processing the scent formulation information. Such embodiments may be practiced in connection with any of the methods and systems heretofore described. In FIGS. 25 and 26 the authentication and processing steps may be any suitable procedures (such as those described hereinabove). In these embodiments and the foregoing figures and description it should be noted that the temporal order of reading scent formulation information and other information is not critical, and it is possible that one form of information may be read before, after, or simultaneously with the other form of information.

It is contemplated that numerous additional security planchettes may be incorporated into a token in conjunction with the present invention. Examples of heretofore describes security planchette and associated methods are based on detection on transmitted radiation, rub-off overlays, measurement of physical dimensions marking on the card, use of special inks such as ultra-violet and infra-red, microprinting, intaglio, latent images based on visible, magnetic, or otherwise latent images, inks that are chemical or thermally activated, holograms, special construction (such as laminated construction) biometrically encoded information (such as DNA information, iris information, finger print information, photo information, voice information, gait information) taggents, special fibers, watermarks, and so forth. In one embodiment, for instance, information is magnetically encoded in accordance with ANSI/ISO/IEC 7811-2, which provides for a three-track recording strip that allows for longitudinal redundancy check. In some embodiments, papers that contain structured magnetic particles such as these sold under the trademark TechMark™ by Appleton Papers Inc. of Appleton, Wis. may be employed.

Thus, it is seen that the forgoing general objects have been satisfied. In preferred embodiments of the invention, token array and methods employing authentication tokens bearing scent formulation information compositions are provided. The tokens, token array, and methods are suitable for use in numerous authentication applications.

The scope of the appended claims should not be deemed limited by the preferred embodiments described hereinbefore. No language in the specification of this application or of any priority application should be regarded as limiting the express scope of any of the appended claims. All methods described herein may be preferred in any appropriate order. All references cited herein are hereby incorporated by reference in their entireties.

What is claimed is:

1. A token array comprising a plurality of authentication tokens, each of said tokens bearing at least two scent components, said array comprising at least two fractions, each of said fractions comprising at least one token that includes scent formulation information, each of the tokens in each of said fractions have similar scent formulation information and each of said tokens in each of said fractions having dissimilar scent formulation information from tokens in other fractions; and a token array comprising said scent components being carried in gelatin matrix.

2. A token array according to claim 1, at least some of said tokens comprising paper substrates containing scent components.

3. A token array according to claim 1, said scent components comprising microencapsulated scent components.

4. A token array according to claim 1, said tokens further including machine-readable information selected from among magnetic information and machine-readable visible indicia.

5. A token array according to claim 1, said array including at least five token fractions.

6. A token array comprising a plurality of authentication tokens, each of said tokens bearing at least two scent components, said array comprising at least two fractions, each of said fractions comprising at least one token that includes scent formulation information, each of the tokens in each of said fractions having similar scent formulation information and each of said tokens in each of said fractions having dissimilar scent formulation information from tokens in other fractions, said fractions including at least first and second fractions, said scent formulation information in said first fraction differing from said scent formulation in said second fraction at least in that a first scent component is used in said first fraction and a second scent component is used said second fraction.

7. A token array comprising a plurality of authentication tokens, each of said tokens bearing at least two scent components, said array comprising at least two fractions, each of said fractions comprising at least one token that includes scent formulation information, each of the tokens in each of said fractions having similar scent formulation information and each of said tokens in each of said fractions having dissimilar scent formulation information from tokens in other fractions, said fractions including at least first and second fractions, said scent formulation in said first fraction differing from said scent formulation in said second fraction at least in that first quantity of a scent component is used in said first fraction and a second quantity of said scent component is used in said second fraction.

8. A method for selectively executing a positive match procedure, comprising in any appropriate order providing an authentication token that is expected to contain scent formulation information;
retrieving scent formulation information from said token;
obtaining an expected scent formulation information;
determining whether said scent formulation information matches said expected scent formulation information;
executing said positive match procedure only if said scent formulation information matches said expected scent formulation information; and
wherein said token is expected to be selected from a plurality of tokens in a token array, said token array comprising a plurality of authentication tokens, said array comprising at least two fractions, each of said fractions comprising at least one token that includes scent formulation information, each of the tokens in each of said fraction have similar scent formulation information and each of said tokens in each of said fractions having dissimilar scent formulation information from tokens in other fractions.

9. A method according to claim 8, said scent formulation information comprising information as to at least two scent components.

10. A method according to claim 8, said scent formulation comprising information as to whether a first scent component is detected.

11. A method according to claim 8, said scent formulation information comprising information as to the quantity of a first scent component detected.

12. A method according to claim 8, wherein said expected scent formulation information is obtained via querying a database for expected scent formulation information.

13. A method according to claim 12, said database being remote from the point of retrieval of said scent formulation information, said method comprising communicating with said database over a communications network.

14. A method for selectively executing a positive match procedure, comprising in any appropriate order:
providing a token expected to contain scent formulation information;
retrieving scent formulation information from said token;
retrieving additional token information from said token;
querying a database for a database record that correlates said scent formulation information and said additional token information;
determining whether said scent formulation information and said additional token information correlate with said database record;
executing said positive match procedure only if said scent formulation and said additional token information correlate with said database record.

15. A method according to claim 14, said database being remote from the point of retrieval of said scent formulation information, said method comprising communicating with said database over a communications network.

16. A method for selectively executing a positive match procedure, comprising in any appropriate order:
providing a token expected to contain scent formulation information;
retrieving scent formulation information from said token;
retrieving additional token information from said token;
algorithmically comparing said scent formulation information and said additional token information;
executing said positive match procedure only if said algorithm is satisfied.

17. A method according to claim 16, said database being remote from the point of retrieval of said scent formulation information, said method comprising communicating with said database over a communications network.

18. A method for selectively executing a positive match procedure, comprising in any appropriate order:
providing a token expected to contain scent formulation information;
retrieving scent formulation information from said token;
retrieving additional information;
querying a database for a database record that correlates said scent formulation information and said additional information;
determining whether said scent formulation information and said additional information correlate with said database record;
executing said positive match procedure only if said scent formulation information and said additional information correlate with said database record.

19. A method according to claim 18, said database being remote from the point of retrieval of said scent formulation information, said method comprising communicating with said database over a communications network.

20. A method according to claim 18, said additional information comprising a personal identification number.

21. A method for storing information, comprising in any appropriate order:
receiving a token expected to contain scent formulation information;
retrieving scent formulation information from said token;
receiving additional token information; and
storing said scent formulation information and said additional token information in a database record.

22. A method according to claim 21, said database being remote from the point of retrieval of said scent formulation information, said method comprising communicating with said database over a communications network.

23. A method for storing information, comprising in any appropriate order:
receiving a token expected to contain scent formulation information;
receiving additional information; and
storing said scent formulation information and said additional information in a database record.

24. A method according to claim 23, said database being remote from the point of retrieval of said scent formulation information, said method comprising communicating with said database over a communications network.

25. A method for storing information, comprising in any appropriate order:
receiving a token expected to contain scent formulation information;
retrieving scent formulation information from said token;
receiving identification information; and
storing said scent formulation information and said identification information in a database record.

26. A method according to claim 25, said database being remote from the point of retrieval of said scent formulation information, said method comprising communicating with said database over a communications network.

27. A method for storing information, comprising in any appropriate order:
receiving scent formulation information;
receiving additional token information, said additional token information and said scent formulation information being common to a token; and
storing said additional token information and said scent formulation information in a database record.

28. A method for storing information, comprising in any appropriate order:
receiving scent formulation information;
receiving additional information, said additional information and said scent formulation information being common to a token; and
storing said additional information and said scent formulation in a database record.

29. A method for storing information, comprising in any appropriate order:
receiving scent formulation information;
receiving additional token information, said scent formulation information and said additional token information being common to a token;
receiving additional information;
algorithmically computing a check value from said scent formulation information and said additional token information; and
storing said additional information and said check value in a database record.

30. A method for storing information, comprising in any appropriate order:
receiving scent formulation information;
receiving identifying information corresponding to an entity expected to be associated with said token; and
storing said scent formulation information and said identifying information in a database record.

31. A method for imparting information onto a token, comprising in any appropriate order:
providing scent formulation information;
providing additional token information, said additional token information being associated with said scent formulation information; and
placing said scent formulation information and said additional token information onto a token.

32. A method according to claim 31, said additional token information comprising machine-readable magnetic information.

33. A method according to claim 31, said additional token information comprising machine-readable visible indicia.

34. A method according to claim 31, said scent formulation information and said additional token information being associated by correlation in a database record.

35. A method according to claim 34, wherein said correlation is established after said scent formulation information has been placed onto said token.

36. A method according to claim 31, said scent formulation information and said additional token information being algorithmically associated.

37. A method according to claim 31, further comprising placing non-authentic information onto said token.

38. A method for processing token information comprising:
providing a token that contains scent formulation information and additional token information;
authenticating said token using said scent formulation information; and
if said token is thereby deemed authentic, processing said additional token information.

39. A method for processing token information comprising:
providing a token that contains scent formulation information and additional token information;
authenticating said token using said additional token information; and
if said token is thereby deemed authentic, processing said scent formulation information.

* * * * *